United States Patent
Zaidi et al.

(10) Patent No.: US 7,343,625 B1
(45) Date of Patent: Mar. 11, 2008

(54) SYSTEM, METHOD AND COMPUTER PROGRAM PRODUCT FOR AUTOMATED INTERACTION WITH AND DATA EXTRACTION FROM JAVA APPLETS

(75) Inventors: Asad A. Zaidi, Newark, CA (US); Vladimir S. Soskov, Castro Valley, CA (US); Quinton Y. Zondervan, Boston, MA (US)

(73) Assignee: NVIDIA International, Inc., St. Michael (BB)

(*) Notice: Subject to any disclaimer, the term of this patent is extended or adjusted under 35 U.S.C. 154(b) by 819 days.

(21) Appl. No.: 10/011,270

(22) Filed: Oct. 25, 2001

Related U.S. Application Data

(63) Continuation-in-part of application No. 09/942,081, filed on Aug. 28, 2001.

(51) Int. Cl.
  G06F 11/00 (2006.01)
  G06F 12/14 (2006.01)
  G06F 12/16 (2006.01)
  G06F 15/18 (2006.01)
  G08B 23/00 (2006.01)

(52) U.S. Cl. .......................... 726/25; 725/23; 709/202; 709/203; 709/224; 709/246; 713/155; 713/164; 713/180; 713/187; 713/188; 713/189

(58) Field of Classification Search ................ 709/202, 709/203, 224, 246, 223; 713/155, 164, 180, 713/187, 188, 189
See application file for complete search history.

(56) References Cited

U.S. PATENT DOCUMENTS

| | | | | |
|---|---|---|---|---|
| 5,974,549 A | * | 10/1999 | Golan | 713/200 |
| 5,983,348 A | * | 11/1999 | Ji | 713/200 |
| 6,046,740 A | * | 4/2000 | LaRoche et al. | 715/764 |
| 6,539,422 B1 | * | 3/2003 | Hunt et al. | 709/217 |
| 6,625,581 B1 | * | 9/2003 | Perkowski | 705/27 |
| 6,691,163 B1 | * | 2/2004 | Tufts | 709/224 |
| 6,757,685 B2 | * | 6/2004 | Raffaele et al. | 707/10 |
| 6,775,644 B2 | * | 8/2004 | Myers | 702/186 |
| 6,823,373 B1 | * | 11/2004 | Pancha et al. | 709/219 |
| 6,826,553 B1 | * | 11/2004 | DaCosta et al. | 707/1 |
| 6,842,782 B1 | * | 1/2005 | Malik et al. | 709/224 |
| 6,920,505 B2 | * | 7/2005 | Hals et al. | 709/238 |

OTHER PUBLICATIONS

U.S. Appl. No. 09/953,372, filed Sep. 14, 2001.

* cited by examiner

*Primary Examiner*—Michael Won
(74) *Attorney, Agent, or Firm*—Zilka-Kotab, PC

(57) ABSTRACT

A system, method and computer program product for extracting data from an applet are provided. Data from a data page is downloaded to a browser. The data includes an applet written in Java. Additional spy code is added. The spy code is used for interacting with the applet on the browser. Data is extracted from the applet using the spy code. Also, other types of interactions with the applet can be performed using the spy code. A method for extracting data from a browser object is also provided.

35 Claims, 29 Drawing Sheets

SYSTEM, METHOD AND COMPUTER PROGRAM PRODUCT FOR AUTOMATED INTERACTION WITH AND DATA EXTRACTION FROM JAVA APPLETS

RELATED APPLICATIONS

This application is a continuation in part of co-pending U.S. patent application entitled System, Method and Computer Program Product For A User Agent For Pattern Replay, filed on Aug. 28, 2001 under Ser. No. 09/942,081, and assigned to common assignee Clickmarks, Inc., and which is incorporated herein by reference for all purposes.

FIELD OF THE INVENTION

The present invention relates to computer-related transactions, and more particularly to automated interaction with Java applications.

BACKGROUND OF THE INVENTION

The Internet is composed of content distributed in the World Wide Web and various intranets. While a large fraction of the content is static, the truly interesting content is the one that a user can interact with dynamically. This content is of various types including, but not limited to (i) the content stored in various databases, (ii) e-commerce web-pages, (iii) directories, (iv) intranet pages, (v) data warehouses, etc.

The interaction with this dynamic content is accomplished through (i) queries/submissions to databases, (ii) buying/selling/interacting through e-commerce, (iii) running queries and lookups in directories, (iv) accessing and interacting with content resident on intranet pages (including on individual computers), and/or (v) accessing, interacting with, adding, subtracting or modifying content resident in data warehouses.

The access to or interaction with this dynamic content is done in a variety of ways. For example, such interaction may be accomplished through direct access to the databases by running specific commands or through form submissions on the Internet that run specific queries or perform specific actions. This interaction requires the submission of necessary parameters or information to complete a query or interaction (addition, modification, subtraction) with the dynamic content. This information may need to be submitted in multiple steps. Once the submission of information is finished, the results of the interaction/query/e-commerce are sent back to the user.

Each time a user wishes to interact in the foregoing manner, the user is required to carry out each and every one of the steps associated with the submission of necessary parameters or information. If a same type of transaction is to be carried out in a repeated manner, this may be very time consuming and problematic. Moreover, being able to fetch various content items from Java applets in an automated fashion is valuable in and of itself. It enables data that has thus been fetched by the system in the background to be processed in various ways. For example, an alert could be set on financial information aggregated from a commercial web site in this manner. That data could also, for example, be used in various financial calculations and transactions.

Accordingly, accessing web content is more complicated than simply making individual HTTP requests. The prior art has yet to enable fetching of the same content as the user and rendering it the same way the user saw it. To do this, the appropriate content must be fetched across the network. It must then be rendered correctly. An additional step comes even before these. First, the content must exist for it to be fetched. It sometimes will just pop up on the page on its own, but typically one must perform some actions (firing Java events) to cause it to be created. For instance, HTTP actions as well as Java and Javascript events must be fired.

When fetching the content, the user may first be required to log in, run a search for a certain term, or fire an event. More generally, the content of interest could be generated by an arbitrary web transaction. Logging in and running a search are all examples of web transactions. Thus, fetching content requires support for various authentication and network protocols, management of client-side state information, support for the appropriate cipher strength, and/or be able to fire events.

It should be noted that fetching any interactive web content requires the ability to be able to execute web transactions. In the case of non-interactive content (e.g. the top headlines from a news site), no transaction is required to retrieve the content. One simply has to request the page from the remote server. However, if any interaction is required to access that content (e.g. weather report for a particular zip code), the transaction must be executed before the content can be retrieved.

Web transactions vary in their complexity. They may be as simple as entering a zip code to receive a customized weather report. On the other hand, they may be complex enough to involve logging in to a secure stock trading site, browsing to a particular page on the site, submitting a query and then browsing to a specific section in the report to obtain the current credit rating of a company.

Interaction with Java applets poses a particularly challenging problem. The question posed is how does one integrate the applet with background functionalities to automatically take data out of the applet so that it can be used or have functions applied to it.

To apply functionality to the data, the data must be retrieved from the applet. Prior to the present invention, it was not possible to create an application with the ability to interact with an uncooperative third-party Java applet to extract data from it. This is particularly true of applets running in a security context in a browser, where the applet does not have access to data and programs on the computer outside of the browser, and outside programs or other applets cannot access the applet if they do not share the same security domain.

The reason no one has been able to solve the problem is that, because of the way current browsers like Microsoft Internet Explorer and Netscape Navigator are coded, the application trying to access the applet must come from the same source as the Java applet. For example, a JavaScript piece of code and a Java applet on the same page would both have to know how to communicate with each other and how to exchange the data. The JavaScript would need to know what methods to call the Java object, what those methods represented, what the data is when it is returned by the method, etc. If they were not from the same domain, this interaction would not be possible at all.

Thus, what is needed is a way to overcome the limitations of the prior art and allow extraction of data from a Java applet.

SUMMARY OF THE INVENTION

A system, method and computer program product for extracting data from an applet are provided. Data from a data page is downloaded to a browser. The data includes an applet written in Java. Additional spy code is added. The spy code is used for interacting with the applet on the browser. Data is extracted from the applet using the spy code. Also, other types of interactions with the applet can be performed using the spy code.

In one embodiment, a user agent is initiated and used to navigate to the data page having the applet. The spy code can be stored on a local device, including the device hosting the browser. In a further embodiment, the data page is rendered as XHTML or some other suitable format. As an option, the data extracted from the applet can be displayed to a user. Preferably, the user is allowed to record user interactions with the applet.

In an embodiment, a structural analysis of the applet is performed for identifying data for extraction. Note that the structural analysis can be performed during replay of the recorded user interactions, with the data being identified per the user's specifications. The extracted data can be formatted into a structured format. Functionality can be applied to at least a portion of the extracted data. Such functionality can include mobilizing at least a portion of the extracted data, placing the extracted data in a habitat, setting an alert on at least a portion of the extracted data, applying user input to the applet using the spy code, etc.

A method is also provided for interacting with an applet according to one embodiment. A network site is accessed utilizing a network. User interaction is simulated for navigating the network site based on client specifications. A web page is downloaded from the site to a browser. The web page includes a Java applet. Identifiers are assigned to elements of the web page. The web page is rendered on a browser for further processing. Dynamic content of the web page is also rendered.

Spy code is retrieved and added. The spy code is used to interact with the applet on the browser. The rendered web page is displayed on the browser. The user can interact with the applet. The spy code is run on the browser in the same security context as the applet. A structural analysis of the applet is performed for identifying data for extraction. Data is extracted from the applet using a user agent. The extracted data is formatted into a structured format and exported.

A method is also provided for extracting data from an applet. According to the method, data from a data page is downloaded to a browser. The data includes a browser object, such as an ActiveX control. Additional spy code is added. The spy code is used for interacting with the browser object on the browser. Data is extracted from the browser object using the spy code. Also, other types of interactions with the browser object can be performed using the spy code.

In one embodiment, a user agent is initiated and used to navigate to the data page having the browser object. The spy code can be stored on a local device, including the device hosting the browser. In a further embodiment, the data page is rendered as XHTML or some other suitable format. As an option, the data extracted from the browser object can be displayed to a user. Preferably, the user is allowed to record user interactions with the browser object.

In an embodiment, a structural analysis of the browser object is performed for identifying data for extraction. Note that the structural analysis can be performed during replay of the recorded user interactions, with the data being identified per the user's specifications. The extracted data can be formatted into a structured format. Functionality can be applied to at least a portion of the extracted data. Such functionality can include mobilizing at least a portion of the extracted data, placing the extracted data in a habitat, setting an alert on at least a portion of the extracted data, applying user input to the browser object using the spy code, etc.

DESCRIPTION OF THE PREFERRED EMBODIMENTS

Glossary

Figure 1:
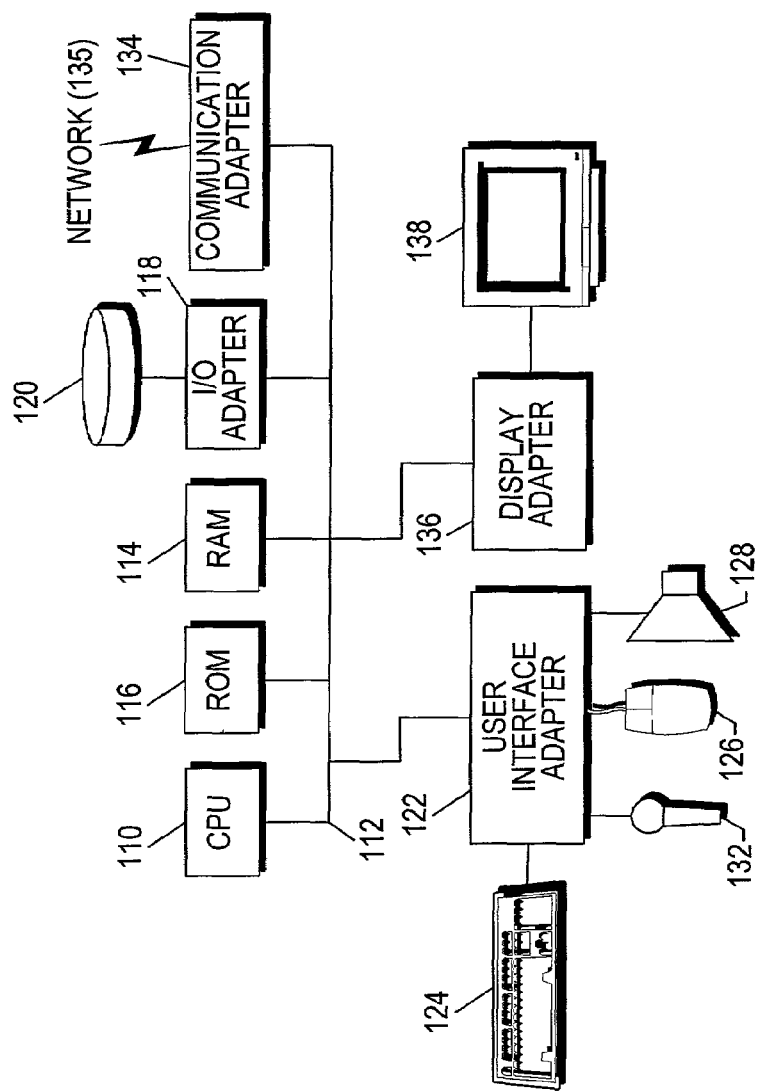
FIG. 1 illustrates a typical hardware configuration of a workstation in accordance with a preferred embodiment.

| | |
|---|---|
| action | An event which can be executed by the user or by script to change the state of the remote application (thus changing the state of the local application). For example, clicking a link. |
| content | Any content. Also includes a sub-tree of a full DOM tree. |
| client | A process which makes requests to and, presumably, gets web pages from the User Agent. |
| connector | An internal module of the platform, which can execute a state in a pattern recorded by the IDT. |
| CRM | Content Retrieval Module, a component of the platform. |
| custom (local) application | An application created utilizing the platform |
| DOM | Document Object Model, a W3C standard for describing XML documents in an object-oriented fashion. |
| DTD | Document Type Definition, a document used to define an XML markup language. It contains the rules by which an XML Document of the corresponding markup language is constructed/validated. |
| element | An XML element. Everything from <tag> to </tag> |
| HTML connector | A component of the platform. Also called the XML connector. This component calls the User Agent directly. |
| IDT | Interactive Design Tool, the design tool of the platform. Allows a user to create patterns and custom application layouts. |
| pattern | A collection of states grouped together by a platform user to be used as one functional element in the custom application. |
| platform | The platform of the system. |
| PRE | Pattern Replay Engine, a component of the platform that replays patterns recorded by the IDT. |
| remote application | An application, which exists on some remote site and has some functionality of interest that the user of the platform desires to extract from it. (For, example Yahoo Mail is a remote web application). |
| remote state (remote output) | Corresponds to a stable output from a remote application at some point in time. (In case of Yahoo Mail, the login page is one state and the page, which displays the Inbox, is another state.) |
| SessionManager | A class responsible for keeping track of active sessions and associated data such as Patterns and Variables. |
| SRM | State Recognition Module, a component of the platform. Provides state recognition and content retrieval functionality. |
| state | State of the remote application as defined by the user of the platform (the designer). (This will usually correspond to a given remote state; however, since not all parameters of the remote system are known, the local state cannot have all of the information that is available to the remote state.) States are contained within a Pattern (see definition). |
| step | A Step is part of a larger sequence of mappings to States. The list of Steps serves as a history of the States traversed by the PRE. The reason for using Steps is the user may go "Back" to a previous State in the Pattern and initiate an Action from that particular point in the traversal history. |
| UA | The User Agent, a component of the platform. Used to fetch the output from a remote application and execute any user actions on that output. |
| variable | Represents a value which the designer's scripting code can manipulate. Variables can be one of the following three scope types: User, Session, or Application. And the Variable's underlying value can be one of three value types: (1) Primitive (not strongly-typed) (e.g. int, string, boolean), (2) Record (which is like a struct), and (3) Table (a list of records). |
| web content | See content. |
| XHTML | Extensible HyperText Markup Language, an XML-compliant version of HTML. XHTML is viewable on major browsers. |
| XML | Extensible Markup Language, a syntax for creating SGML-compliant markup documents. The rules by which a document is constructed/validated can be specified via a DTD or XML Schema. XHTML is an example of an XML compliant markup language. XML documents may also be created which do not correspond to an explicitly defined schema. Such documents are said to be well-formed if they conform to the syntactical rules of XML, but their overall structure can be arbitrary. |
| XML connector | An internal module of the platform, which can execute an Extensible Markup Language (XML) state in a pattern recorded by the IDT. Also called the HTML connector. |

Illustrative System Architecture

FIG. 1 illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 328, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows Operating System (OS), the IBM OS/2 operating system, the MAC OS, or UNIX operating system. Those skilled in the art may appreciate that the present invention may also be implemented on platforms and operating systems other than those mentioned.

Figure 2:
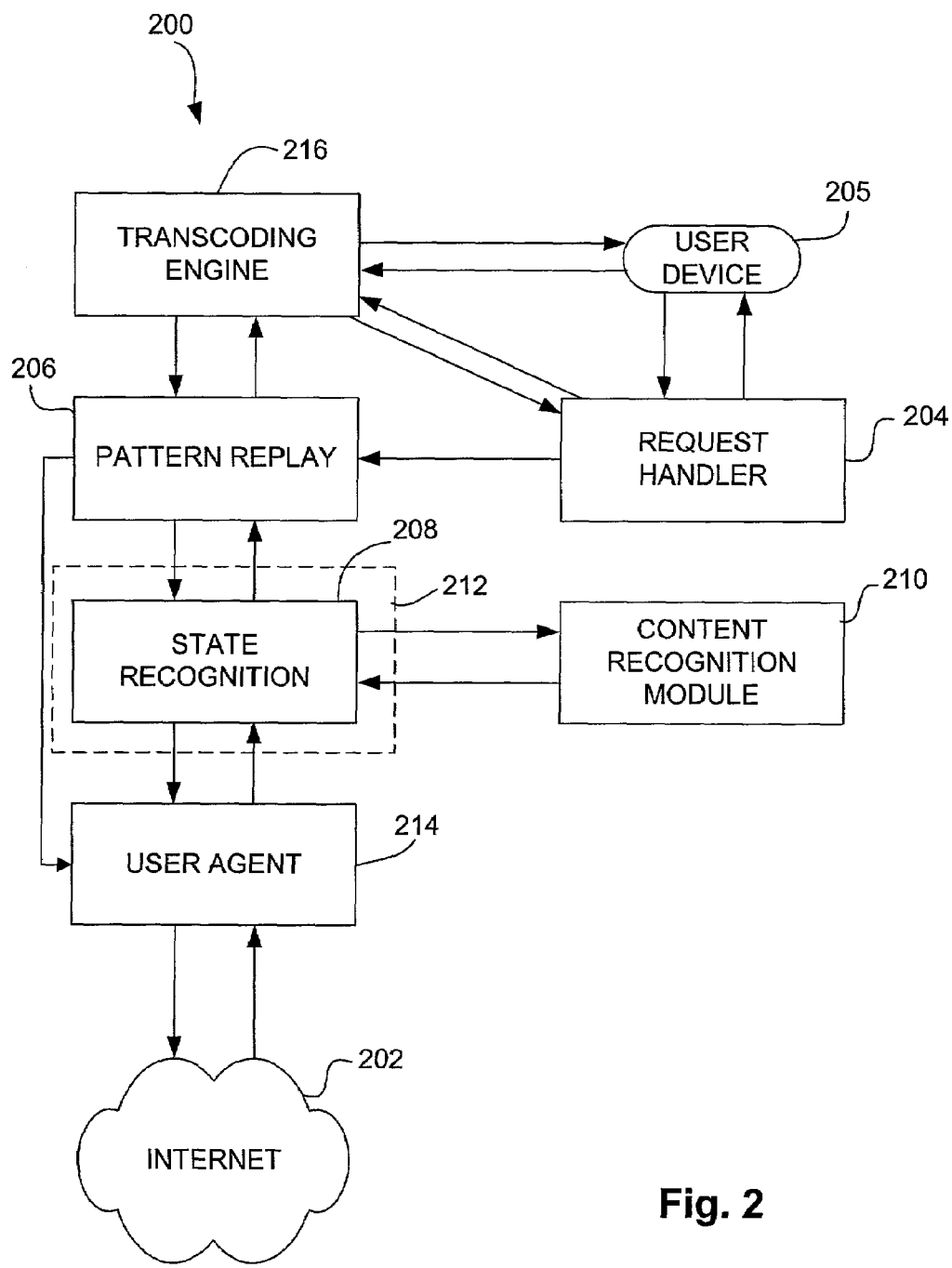
FIG. 2 illustrates a system for navigating a network, including conducting transactions, in accordance with one embodiment of the present invention.

FIG. 2 illustrates a system 200 for navigating a network 202, including conducting transactions, in accordance with one embodiment of the present invention.

A Request Handler (RH) 204 communicates with a user device 205. The RH manages requests from the user device, routing them to the appropriate system component. When a user requests a transaction, the request is sent to a Pattern Replay Engine (PRE) 206, which replays a pattern for conducting a transaction on behalf of a user. More information about the PRE is set forth below.

The State Recognition Module (SRM) 208 determines which state a website is in based on its current output, such as a structure of the current output. The SRM may communicate with a Content Recognition Module 210, which recognizes individual documents that can comprise a state. A Connector 212 is in communication with the SRM. The Connector executes a state in the pattern. The SRM, Content Recognition Module, and connector are described in detail below. More information about operation and functionality of the Content Retrieval Module is found in U.S. patent application entitled SYSTEM, METHOD AND COMPUTER PROGRAM PRODUCT FOR RETRIEVING ARBITRARY CONTENT FROM A REMOTE DATA SITE FOR OUTPUT TO A DEVICE IN A FORMAT SUITABLE FOR THAT DEVICE, filed concurrently herewith and assigned to common assignee Clickmarks, Inc., and which is herein incorporated by reference.

The User Agent 214 is used by other components of the system to provide the actual interaction with a remote website. For example, when replaying a pattern, the SRM communicates with the User Agent via the Connector to provide instructions to the User Agent. The other system components have intelligence built into them that instructs them how to utilize the User Agent. For example, when a user clicks on a button on a page, other components instruct the User Agent to navigate to the desired web page and perform some action, such as filling in a form. The User Agent retrieves the resulting page and returns it to the other components.

By default, the User Agent is not running. A listener (not shown) listens for requests. When the listener receives a request, it creates a new User Agent process on the server and returns an identifier that identifies the User Agent process. Subsequently, client processes use the identifier, go to the specific User Agent and instruct it to perform some action. The User Agent performs the action according to the instructions and returns the results of the action.

A Transcoding Page Rending Engine (TRE) 216 renders content for display on the user device. Preferably, the TRE is able to render content on any display environment. More information about operation and functionality of the TRE is found in U.S. patent application entitled SYSTEM, METHOD AND COMPUTER PROGRAM PRODUCT FOR PAGE RENDERING UTILIZING TRANSCODING, filed concurrently herewith and assigned to common assignee Clickmarks, Inc., and which is herein incorporated by reference.

In the present invention, a transaction preferably refers to communicating (i) information and/or actions required to conduct the transaction, and/or (ii) information and/or actions sent back or desired by the user, respectively.

For example, a transaction, in one embodiment, may refer to: information submitted by the user, actions taken by the user, actions taken by a system enabling the access of the user to the data, actions taken by the data to retrieve/modify content, results sent back to the user, and/or any combination or portion of the foregoing entities.

User Agent

The User Agent is able to fetch web pages of interest and render them correctly. The operation of the User Agent can be likened to remote controlling navigation of a browser on a remote server. For example, the User Agent acts as an intermediary on a remote server that can be commanded to go online and retrieve content, and then send it for rendering for output on a wireless device. The system component that renders the content for output on the wireless device is the Transcoding Page Rendering Engine (TRE).

The User Agent can be used both via a network interface and Interprocessor Communication (IPC). Furthermore, it has performance and scalability befitting a server application.

Figure 3:
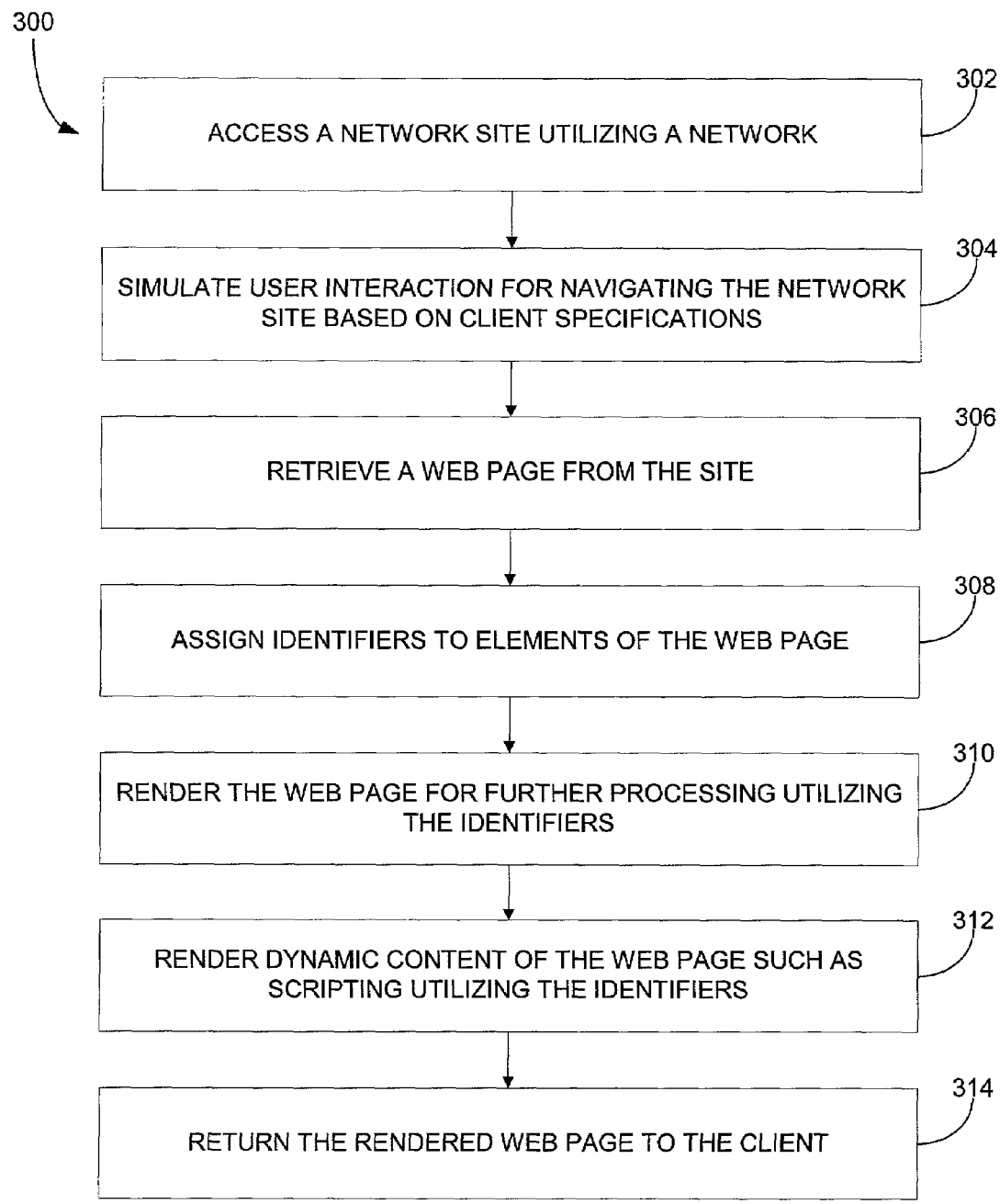
FIG. 3 is a flowchart of a process for User Agent operation according to an embodiment of the present invention.

FIG. 3 is a flowchart of a process 300 for User Agent operation. In operation 302, a network site is accessed utilizing a network. This can be done by navigating to a particular web site using its URL, for example. In operation 304, a user interaction is simulated for navigating the network site based on client specifications (i.e., directions). An example of such navigation is logging in to a web site. The client is a process that makes requests to and receives output from the User Agent. A web page is retrieved from the site in operation 306. Such content can be part or all of a web page, for example, such as the resulting page that is accessible upon logging in to a web site. In operation 308, identifiers are assigned to elements of the web page. For example, the third element on the page could be assigned the ID "3". The web page is rendered for further processing utilizing the identifiers in operation 310. The rendering can include converting the resulting page into XHTML for processing by another system component and/or output on a user device. Note that XHTML is used herein by way of example; any other XML compliant format may be used; that is, if the page loaded by the User Agent is an XML page, as opposed to an HTML page, it is not converted to XHTML, but rather is passed on to the client in its original XML format. In operation 312, dynamic content of the web page such as scripting is rendered utilizing the identifiers. The rendered web page is returned to the client in operation 314. As noted above, the rendered content can be output to a user device, such as a wireless device. The wireless device can include a wireless telephone, Personal Digital Assistant (PDA), handheld computer such as a handheld PC, a pager, a device connected to a wireless modem, or any type of device capable of receiving information where at least one of the communication links is wireless.

In one aspect of the present invention, navigation from the web page is performed. For example, navigating from the web page can include of clicking links on a web page, submitting forms, and/or firing scripting events (clicking a link being a specific kind of event).

In another aspect of the present invention, the client is informed of changed frames. The User Agent is able to inform the client which frame(s) have changed since the last event was executed. Navigating to a specified URL would be considered an event in this context. Typically, this would be used by the client to determine which frames have changed since the last event was executed and it would then request only the modified frames. In a further aspect, specified frames are sent to the client. The User Agent is ideally able to send any frames which are requested to the client. Often, a web page will comprise a single frame. However, if the page comprises multiple frames, the User Agent is able to send a selected single frame (or a specified subset of the frames) to the client.

In a further aspect, a network interface is provided. A runtime engine can use a network interface to make requests to the User Agent. It uses the network interface to navigate the User Agent and to request the web pages from it. As an option, a Component Object Model (COM) interface can be provided. In a preferred environment, the User Agent is embedded as a COM object. The embedding application can then interact with the User Agent's browser component directly. It may then also request the XHTML representations of the current web page. Again, XHTML is used herein by way of example, and any other XML compliant format can be used.

Module Dependencies

The User Agent module is not required to use other modules from the platform. It is used by the HTML connector and the IDT.

Technologies Used

The User Agent is preferably a Windows application. It can use COM and standard Microsoft browser libraries (i.e. MSHTML.DLL). In addition, it can use standard libraries for common functionality (e.g. HTTP communication).

Functionality

The User Agent is able to fetch the web pages and render them "correctly". While there is no universally agreed upon definition of "correct", the User Agent attempts to conform to de facto standards. The User Agent acts, to the degree possible, like a web browser running on a desktop machine and operated by a single user. Broadly speaking, a preferred embodiment of the User Agent:

satisfies all protocol requirements (e.g. HTTP, FTP, SSL and TLS),
supports all technologies of interest (e.g. JavaScript, VBScript),
renders pages in a generally accepted manner
shares no state information with any other User Agent instance.

Remote web sites should not be able to determine whether they are interacting with a human user on a dedicated machine or the User Agent. For example, two different User Agents running on the same server should be able to simultaneously log-in to Hotmail using two different user names (and get two different pages).

Constraints

The User Agent as described herein is designed for use at design-time and runtime. The two usage scenarios impose different constraints.

Design-Time Usage

At design-time, the User Agent is run locally on the designer's machine (embedded directly in the Development Tool (DT) used by the designer). It exposes the browser interface directly to the DT. See also FIG. 4 and the related discussion below for more information.

Runtime Usage

At runtime, the User Agent is run remotely on a dedicated server. A network interface is exposed so that remote clients can interact with the UA. HTTP can be used to provide this interface. As it is a very widely used protocol, it allows for a very flexible system design (as many diverse clients can speak HTTP) and there are a plethora of standard tools (e.g. performance auditing, load balancing, security tracking) available for it. See also FIG. 5 and the related discussion below for more information.

Two Interface Methods: HTTP and COM

The User Agent can support a COM interface so that it can be embedded into the DT at runtime. It can also support an HTTP interface so that it can be used by remote clients at runtime.

Performance and Scalability

The User Agent can be used primarily as a server-side application which services client requests. Each User Agent server is able to support several hundred simultaneous users with acceptable response time. In addition, it is possible to increase the number of users which can be reasonably supported by adding more hardware to the server set-up.

Functionality

Abstraction

The User Agent is able to navigate to a desired web page (rendering any dynamic content) and then send an XHTML representation of the rendered web page (which may comprise several frames) to the client. It also allows for the client to be able to direct it to a specified URL, click links, submit forms and fire scripting events on the page. Preferably, it is able to: Note that XHTML is used herein by way of example, and any XML compliant format can be used.

1. Navigate to a specified URL and retrieve the associated page over the network. This is the process of actually making network requests and receiving responses. It involves handling all required network protocols, including protocol requirements such as maintaining client-side state information (e.g. HTTP cookies) and having appropriate security certificates.
2. Render those pages, tag them and convert them to XHTML. Once the page has been fetched, any dynamic elements (e.g. scripting) are rendered in XHTML for output on the device. While JavaScript is the scripting language of choice, any common scripting language (such as VBScript) could be used. The User Agent also generates and assigns unique IDs to each element on the page. It can use the integer indices of the elements on the page for the IDs (starting from one). For example, the third element on the page would be assigned the ID "3". It then converts the resulting page into XHTML if it is an HTML page. To render a page, the UA executes any scripting which is to be executed upon the page loading (prior to any user actions). Any scripting which is run as a result of a user action (for example, on MouseOver) is not executed at this point. Preferably, no scripting is removed or modified from the page. Thus, if a naïve client loads the page into a script-capable browser, it will then execute any automatic events twice. In addition, if an event is fired, whatever script would have been originally called is executed. If the client wishes to modify these events (so that, for example, onClick calls a script of the client's choice instead of the original script), the client modifies the script.
3. Navigate from the current web page as specified by other Platform components. This includes clicking links on a web page, submitting forms and firing scripting events. This comprises two parts: filling in forms and firing events (clicking a link being a specific kind of event). Given a specified event (complete with all the parameters needed to execute that event, including the element on which the event is to be fired), the User Agent executes the event on the web page. Typical events include onClick and on Submit.
4. Inform the client of changed frames—The User Agent, upon request, informs the client which frame(s) have changed since the last event was executed. Navigating to a specified URL can be considered an event in this context. Typically, this would be used by the client to determine which frames have changed since the last event was executed and it would then fetch only the modified frames.
5. Send specified frames to client—The User Agent can be able to send any frames which are requested to the client. Often, a web page will comprise a single frame. However, if the page comprises multiple frames, the User Agent is able to send only a single frame (or a specified subset of the frames) to the client.

6. Provide a network interface. The runtime engine uses a network interface to make requests to the User Agent. It uses the network interface to navigate the User Agent and to request the web pages from it.
7. Provide a COM interface. The design-time environment can embed the User Agent as a COM object. It is then able to interact with the browser directly. It may then also request the XHTML representations of the current web page.
8. Support scaling easily to multiple server configurations. It is possible to add servers to a UA server farm easily, quickly and without any interruption of service.

The following sections detail the HTTP interface and the COM interface.

HTTP Interface

When running in server mode, the User Agent exposes an HTTP interface. Clients can create new sessions, control existing sessions, retrieve the content of various web pages and terminate sessions via the HTTP interface.

Session Creation

Clients make HTTP POST requests to a well-known URL (e.g. http://user_agent:80) to spawn new UA instances. A new UA instance is spawned and assigned a port number. The body of the response contains the server name and this newly assigned port number. The concatenation of the protocol used, the server name and the port number are called the assigned URL. Clients can then make future requests to the assigned URL.

Clients may specify a timeout period (in seconds) in the body of the response. If the UA instance does not receive any requests in the specified period, it self-terminates. If no timeout period is specified, the UA instance times out after a pre-configured maximum wait period.

Session Termination

To terminate a UA session, the client sends a termination request to the specific UA instance it wishes to terminate. After that instance has been terminated, the client should no longer communicate with the specified server and port. The port number may be recycled for future UA sessions.

Session Control

To interact with the User Agent, a client makes HTTP POST requests to the assigned URL. The body of the request contains the method it wishes to invoke, along with any parameters required for that method. Available methods are listed below in Table 1.

TABLE 1

| Method | Description |
| --- | --- |
| goToURL | Parameters: The absolute URL which the User Agent goes to.<br>Actions: The User Agent goes to the URL specified. This method returns immediately. It does not wait until successfully fetching and rendering the page until it returns. This is to improve performance (the client does not get blocked an HTTP POST request while waiting for the User Agent to finish getting the page).<br>Returns: Success or failure code |
| navigate | Parameters: XML encoding of a series of valid navigation-related actions. There are two types of actions that may be performed: filling form fields and firing events (see below for details).<br>There are two "sub-methods" for navigate.<br>fillFormField [field locations and values] - Fills out the |

TABLE 1-continued

| Method | Description |
| --- | --- |
| | specified fields with the specified data. The client specifies the location of the field and the value to assign to that field. The location comprises the frame in which the target form resides and the element ID of the field in the frame. The client may specify multiple fields in multiple forms in multiple frames in a single request.<br>fireEvent element_ID event [event parameters] - Fires the specified event on the specified element with the specified parameters. Note: Clicking a link is also an event.<br>Actions: The User Agent executes the actions specified. The client may specify zero or more of either type of action in the sequence of their choice. However, the UA only guarantees execution up to an event which causes a page transition. So, for example, if the client tells the UA to click the "Search" button on Google and, subsequently, tells it to enter some string in the text field, the UA will click the "Search" button, detect a page change and ignore the rest of the input. Thus, the client should specify actions in the order in which they are intended to be taken.<br>Returns: Success or failure code |
| changedFrames | Parameters: None<br>Actions: None<br>Returns: Indicates if all frames changed or only some frames changed. Returns the IDs of the frames which changed since the last request in the latter case and all frame IDs in the former case. |
| getOrigHTML | Parameters: The ID of the frame of interest<br>Actions: None<br>Returns: The original, un-rendered HTML of the specified frame |
| getXHTML | Parameters: The ID of the frame of interest<br>Actions: None<br>Returns: The XHTML representation (with element ID's inserted in each tag) of the rendered HTML of the specified frame. Separate frames are requested in separate requests. |
| terminate | Terminates the UA instance |

COM Interface

The COM interface exposes two methods: getXHTML and getIBrowser. These are described in Table 2.

TABLE 2

| Method | Description |
| --- | --- |
| getIBrowser | Parameters: None<br>Actions: None<br>Returns: A handle to the COM browser interface IBrowser |
| getXHTML | Parameters: The ID of the frame of interest<br>Actions: None<br>Returns: The XHTML representation (with element ID's inserted in each tag) of the rendered HTML of the specified frame. Separate frames are requested in separate requests. |

Design

Component Overview

A complete UA server setup involves several components. Namely, the load balancer, the instance manager and the User Agent itself. Not all of these components are necessarily used at both design-time and runtime. The components are first enumerated and described individually. Subsequent sections describe how they are used at design-time and runtime.

Installer

The installer program should install all code necessary for the correct functioning of the User Agent. In addition, it should do any configuration necessary for the correct and efficient functioning of the User Agent. This includes, but is not necessarily limited to, the following:

Changing the Internet Explorer settings so that images are not loaded by default.

Setting the number of network handles and other server resources which may be required to optimize performance.

The Load Balancer

The load balancer is a standard web server hardware load balancer. It acts invisibly as a relay between clients and individual UA servers. It receives HTTP requests from clients and routes those requests to the server with the least load and routes the responses back to the client. It determines load by the number of active HTTP connections each server has. Servers with more active connections are considered to have a heavier load.

This entire process is completely invisible to the client. The load balancer operates on OSI layer 3. Neither the client nor the server need have any knowledge of its existence. The domain portion of the URL to which the client makes requests will point to the load balancer. The load balancer then acts as an intermediary for that HTTP transaction, sending the response from the server back to the client. This is the only request for that session which will be serviced by the load balancer. From this point on, clients will communicate directly with the User Agent instance assigned to them on the server which ended up servicing their rerouted request.

The Instance Manager

The instance manager is a daemon ("service" in Windows terminology) which spawns new UA instances when it receives an HTTP POST request to do so. It then informs the newly spawned UA instance and the client of the port which they should subsequently use to communicate with each other. It may choose any available port for this purpose. It also passes the body of the HTTP request to the new UA instance. Any parameters which are to be passed to the UA are contained in this body.

This is the only request for that session which will be serviced by the instance manager. From this point on, clients will communicate with the UA instance directly via the assigned port. Once the instance terminates, the instance manager may recycle the port for use by another instance.

When it receives a request, the Instance Manager should check to see that sufficient server resources are free to service the request without severely degrading server performance (in extreme cases, causing thrashing or crashing the server). Memory is the most obvious resource in question. However, if any other resources turn out to be severe bottlenecks, they should also be checked. If sufficient resources are not free, the request should be denied and the client should be sent an informative message indicating why the request was denied.

The User Agent

The User Agent is the actual application that does the majority of the work. It does not run by default. The instance manager spawns new UA instances in response to requests. The high-level functionality and interface of the UA has been discussed above. To summarize briefly, the UA's main purpose is to fetch and render web pages and return their XHTML or XML representation to the client.

Design-Time Operation

Figure 4:
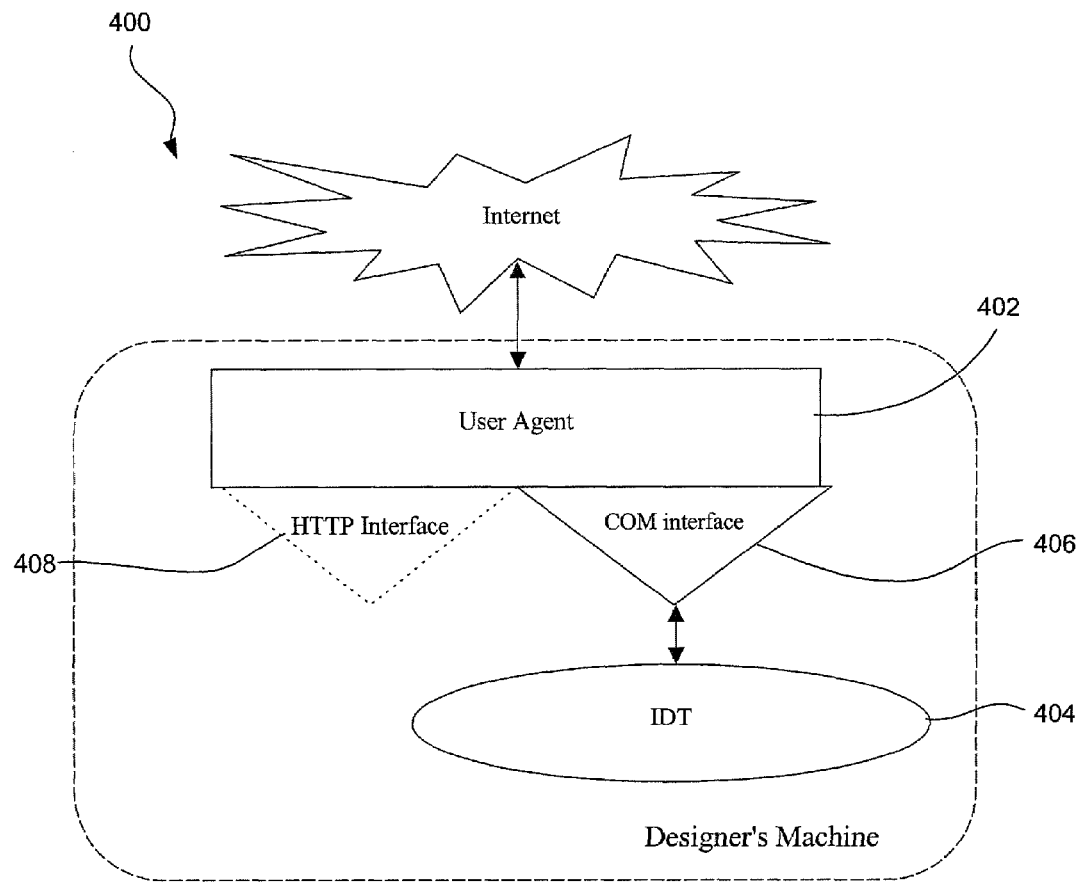
FIG. 4 illustrates a flow of User Agent operation at design-time.

FIG. 4 illustrates a flow 400 of User Agent 402 operation at design-time. Design-time operation is relatively simple from a User Agent point of view. As shown, the IDT 404 simply instantiates the COM object UserAgent. The COM interface 406 exposes two methods (discussed earlier). getXHTML returns the XHTML representation of the current page. getIBrowser returns a handle to the IBrowser object. The HTTP interface 408 is shown in dotted lines because it is unused at design-time.

In effect, the UA acts like a normal browser embedded in the IDT with the sole exception that it offers a method to get the XHTML representation of the page (with element IDs inserted in each tag). It is the responsibility of the IDT to use the browser object to achieve its desired functionality. In particular, it can trap any and all events in browser (including user events such as a right-clicking). It can also access the DOM tree of the current page either for inspection or modification.

Runtime Operation

Figure 5:
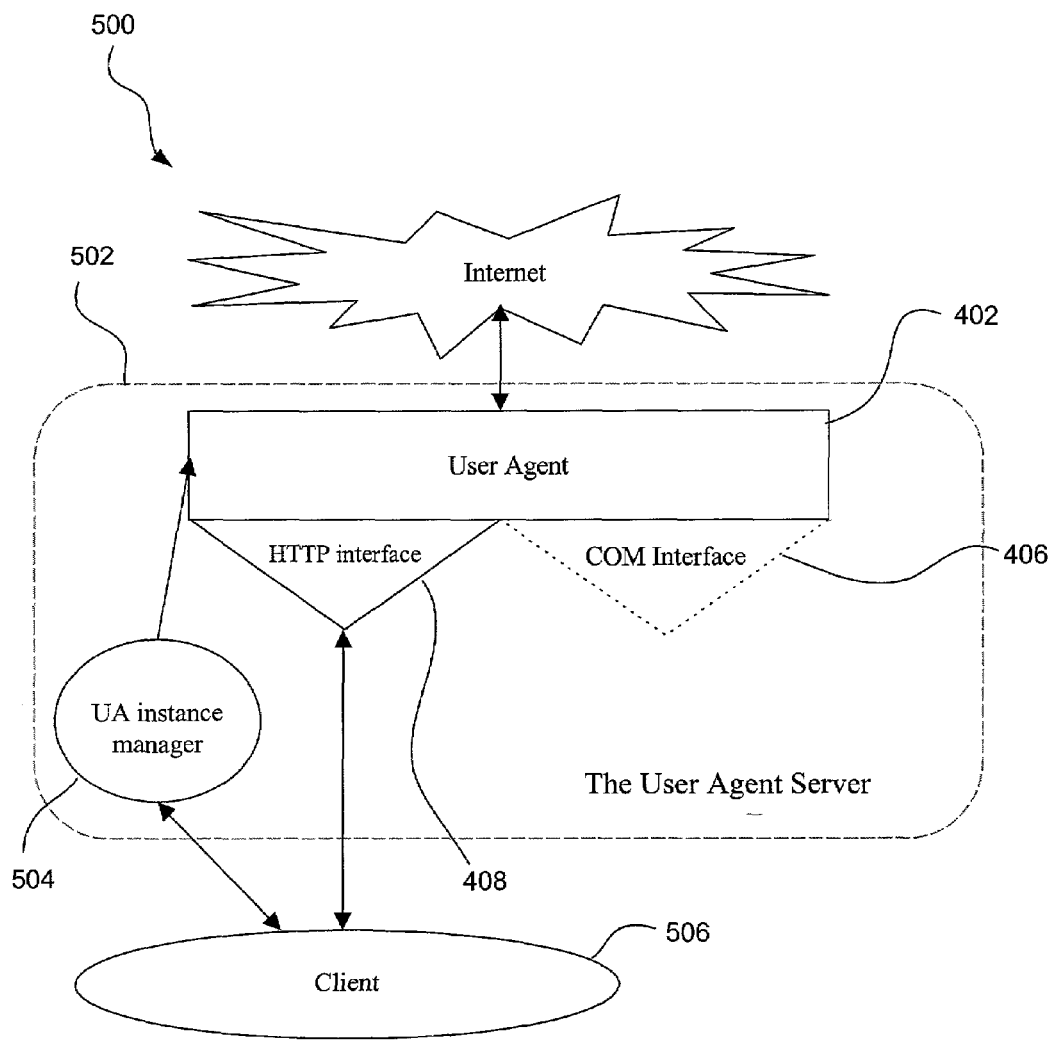
FIG. 5 shows the flow of User Agent operation at runtime.

FIG. 5 shows the flow 500 of User Agent operation at runtime. Runtime operation involves nearly all of the components used at design-time (although the COM interface of the UA is not used). The load balancer receives client requests and routes them to quickest server 502. The instance manager 504 runs as a daemon on the UA servers. Upon receiving a request, they spawn a new UA instance. Clients 506 then communicate directly with the this new UA instance. The COM interface is shown in dotted lines because it is not used at runtime.

Pattern Recording and Replay

The Platform gives its users the ability to create (record) functional elements called patterns and use those elements (replay) in their custom applications. A pattern consists of a collection of states (see Glossary) and states can be of different types. For example, an action that requires accessing the World Wide Web can be represented by an XML (or other type) state and an action that would require sending e-mail can be a part of an SMTP state. Each type of state has a dedicated connector, which is used to create the state definitions and operate on those states. Thus, an XML Connector Module (XCM) is the connector that aids in recording and replaying of XML states. A database connector is used to store and retrieve data from a database, but may not point to a next state. An XML Connector points to a next table. For example, the XML Connector in state A would instruct the UA to execute action X to access state C. Note that the PRE deals with any state, such as a database state (e.g., Yahoo inbox stored in a database).

Figure 6:
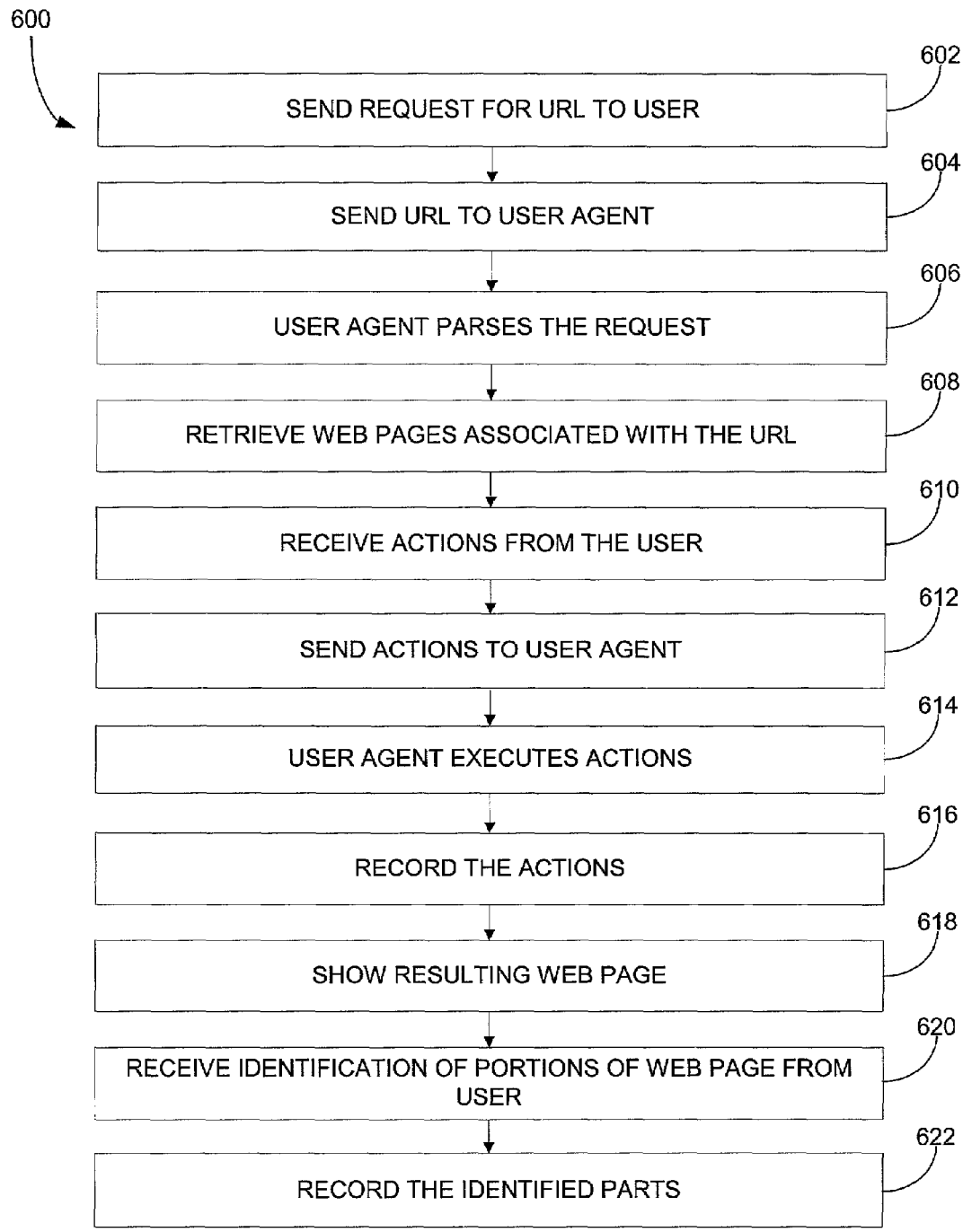
FIG. 6 is a flow chart that illustrates a method for recording a pattern using the User Agent according to one embodiment of the present invention.

FIG. 6 is a flow chart 600 that illustrates a method for recording a pattern using the User Agent. In particular, the user performs the desired navigation and associated input, which are recorded. In operation 602, the user is sent a request for a URL. Upon receiving the URL from the user, the URL is sent to the User Agent in operation 604. The User Agent parses the request in operation 606 to determine a meaning of the request. In operation 608, the User Agent retrieves the web page associated with the URL and sends it back to the user. This (and other) web pages are represented in the pattern as States. In operation 610, actions are received from the user. Such actions can include selection of links, input of data in fields, etc. The User Agent receives the user input in operation 612, and in operation 614, executes the actions on the remote website. The actions are recorded in operation 616. The resulting web page is shown the to the user in operation 618. The user then identifies the parts of the page he or she is interested in, which is received in operation 620. The identified parts are recorded in operation 622.

The system now knows how to retrieve desired information using the pattern. Accordingly, all users using the system can obtain that content. The next (or same) user that wants to perform a similar action enters the URL and the pattern is replayed with the User Agent executing the actions received of operation 614. The parts of the web page that were identified by the user and stored in operation 620 are returned to the user. The user can also define a default area to access in the event that a state is not recognized. See also the description below regarding state identification based on content and probability.

The information stored in a pattern may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

A transaction pattern for any transaction need only be recorded once by anyone with sufficient system access privilege. Once recorded, any user may conduct that transaction, any number of times, by the invocation of the recorded transaction, or "transaction macro."

Since a transaction macro can be stored in any fashion and invoked, directly or indirectly, by any agent (human or automated), it enables the completion of the transaction it describes in any fashion from any device.

As an example of use, suppose the user goes to Amazon.com and wants to search for books about Java. A User Agent performs a search for the books and a predetermined number of results are output. The Buy and Buy Later buttons are output along with the results. The user is allowed to select one of the books. The User Agent retrieves additional information about the book (by following a link, for example). If the user clicks on the Buy button, the User Agent follows a pattern to purchase the book automatically by filling in the appropriate information, including pre-stored user address information and credit card information. A Purchase Completed page is shown to the user stating that the book has been purchased.

Exemplary Pattern Recording Interface

According to a preferred embodiment of the present invention, pattern recording is done through an intuitive interface that allows the user to quickly and easily record patterns. More particularly, the interface allows creation of an application for retrieving a variable from a database as well as creation of an interface for displaying the variable on a particular type and/or model of device.

Figure 7:
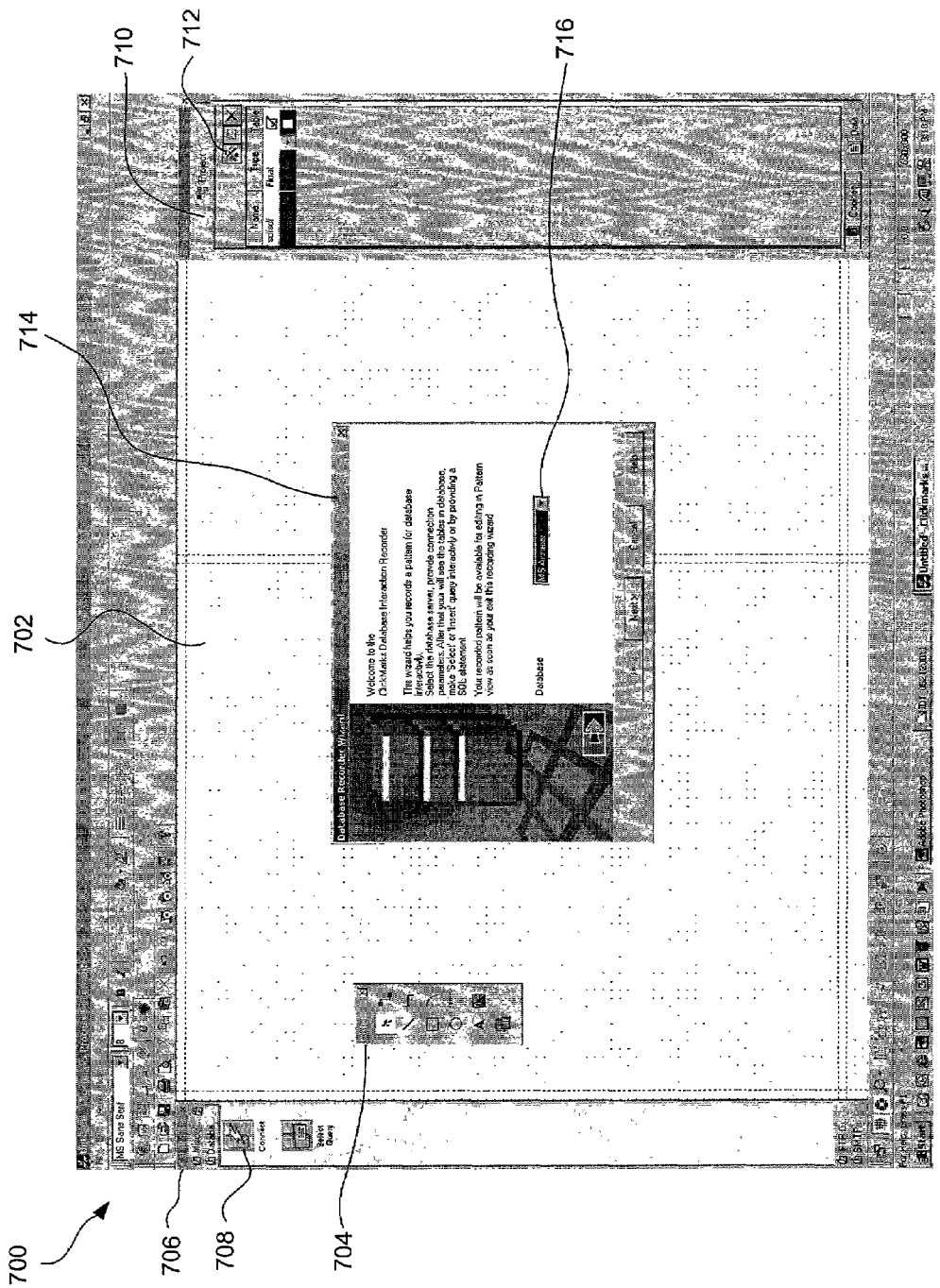
FIG. 7 illustrates a recording interface according to one embodiment of the present invention.

FIG. 7 illustrates a recording interface 700. As shown, a grid screen 702 is provided. It is here that the graphical representation of an application for retrieving data from a data site is displayed. An Object Bar 704 allows insertion of connectors and shapes into the grid screen. A Catalog Bar 706 displays several types of specialized connectors and components. One specialized connector is the database connector 708 representing a connection to a database. Selection of the tabs on the Catalog Bar displays different connectors and components. The items in these bars can be dragged and dropped into the grid screen and connected with connectors from the Object Bar. The Project Bar 710 shows the names and types of variables being manipulated. Variables can be added by using a wizard, which starts upon selection of the wizard button 712.

The following example illustrates creation of an application for retrieving a customer identifier (ID) from a database and creating an interface for displaying the customer ID on a particular type and/or model of device. As will be discussed in the example, the recording interface allows creation of different interfaces for different devices based on the capabilities of each.

Referring again to FIG. 7, a start screen 714 is displayed upon selection of the wizard button. The database server is selected from the drop down menu 716 and the Next button is selected. A database selection screen (not shown) is presented, which allows the user to select the desired database from which the desired data is to be retrieved.

Figure 8:
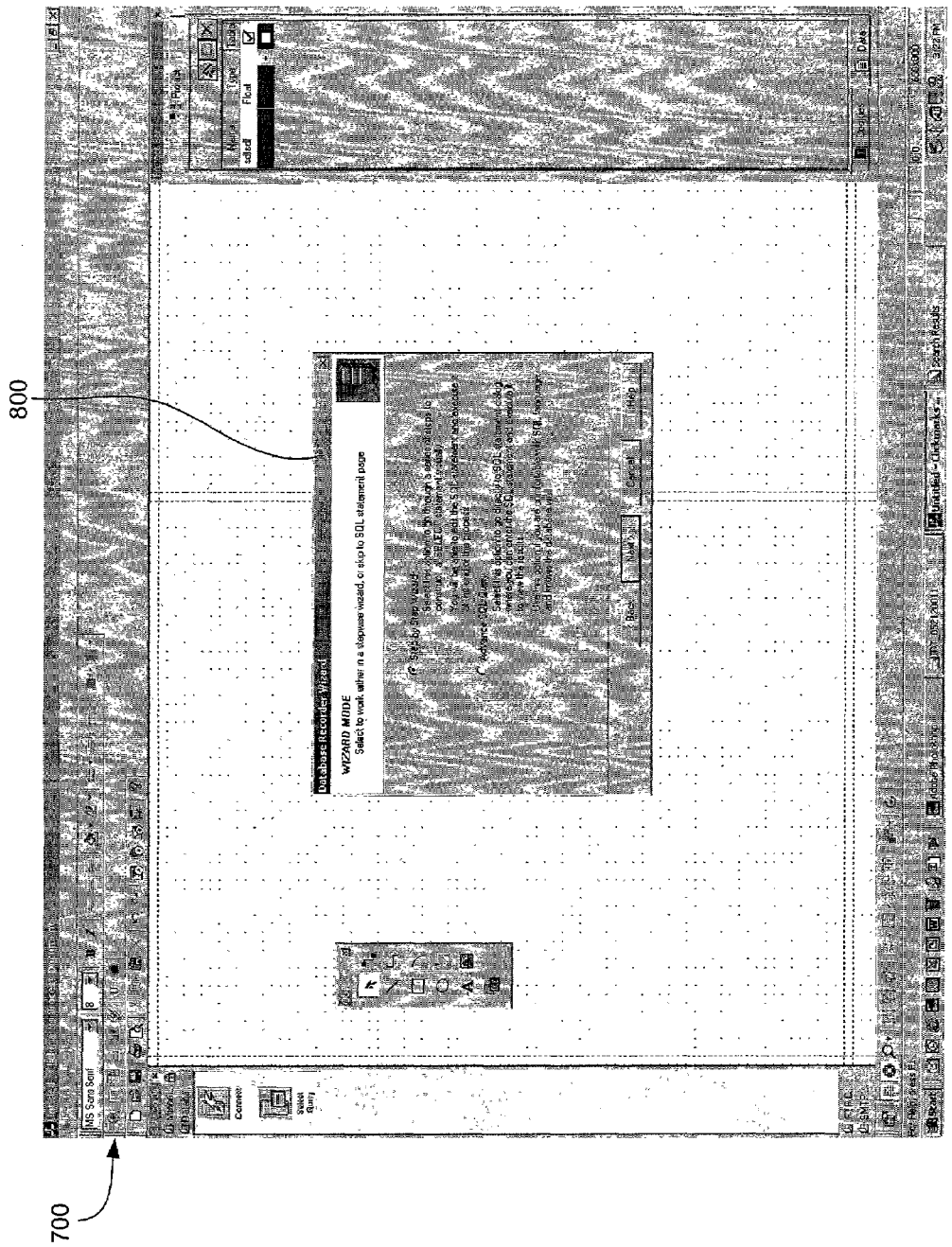
FIG. 8 illustrates a mode selection screen of the interface of FIG. 7.

FIG. 8 illustrates a mode selection screen 800. Here, the user is allowed to select step by step mode or advanced mode. The desired mode is chosen and the Next button is selected. In this example, the step by step mode is shown.

Figure 9:
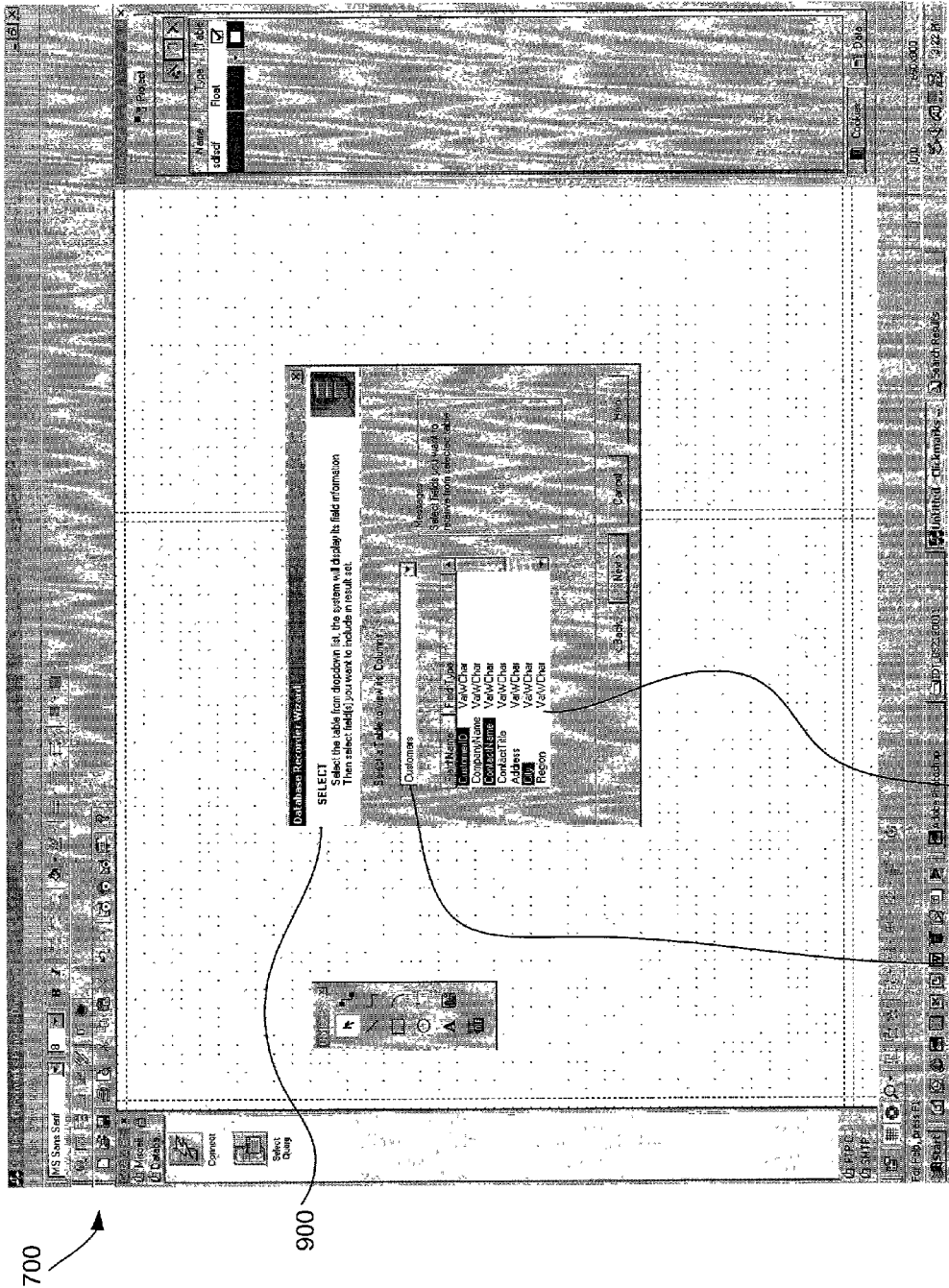
FIG. 9 shows a field selection screen of the interface of FIG. 7.

FIG. 9 shows a field selection screen 900. The tables of the selected database are presented in the drop down menu 902. The user is allowed to select which table to view. The fields of the selected table are presented in the fields display portion 904. The user is allowed to select one or more fields from the field display portion. Note, multiple fields can be chosen using CTRL+R-click. The Next button is selected.

Figure 10:
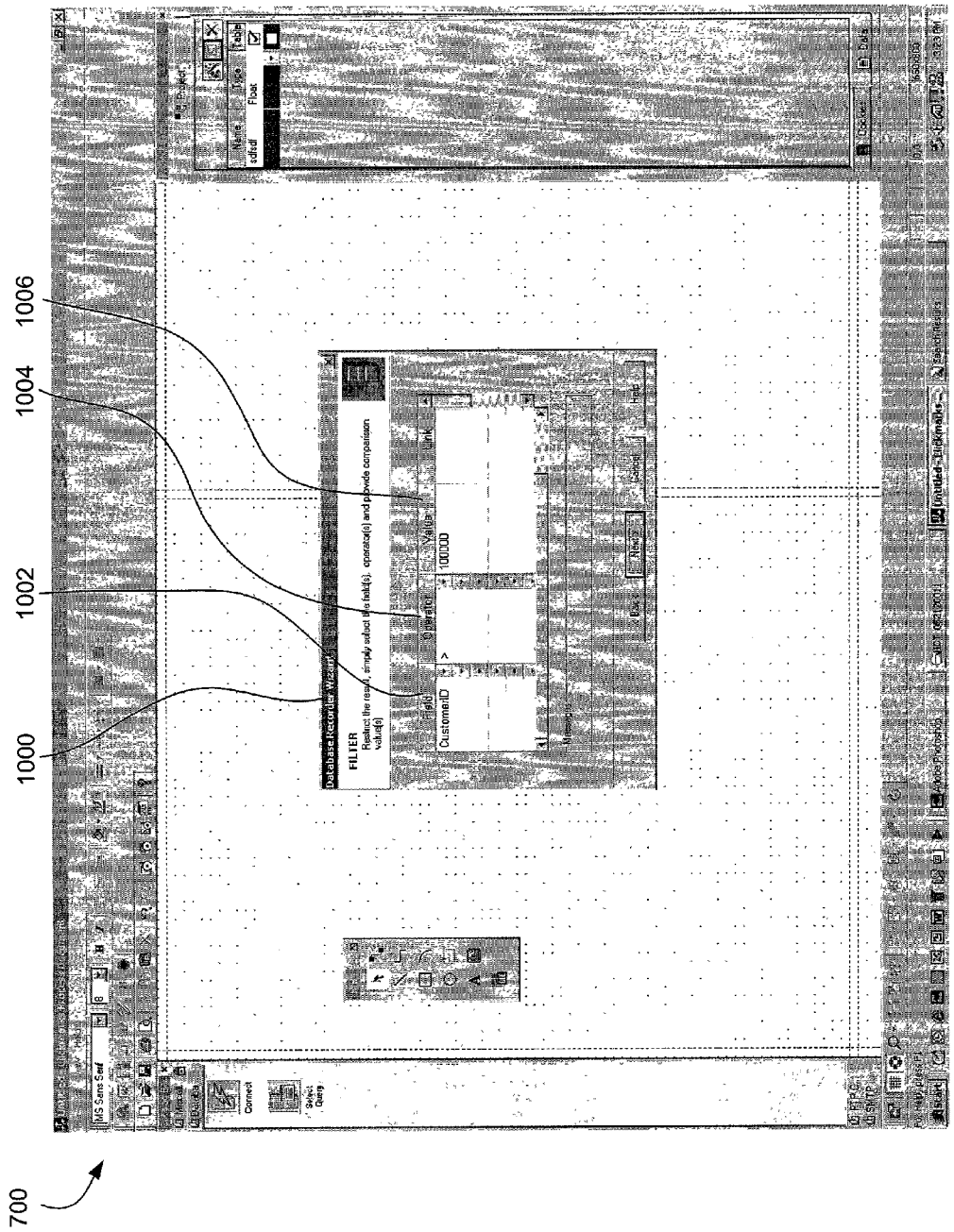
FIG. 10 depicts a filter screen of the interface of FIG. 7.

FIG. 10 depicts a filter screen 1000, which allows entry of filtering elements used to restrict the variables retrieved from the database. As shown, the field chosen in the field selection screen is displayed in the Field column 1002. Operands can be entered into the Operator column 1004 (or chosen from a drop down menu). Illustrative operands include >, <, $\geq$, $\leq$, and =. The Value column 1006 receives comparison values, to which the variables associated with the field are compared using the operand. The Next button is selected.

Figure 11:
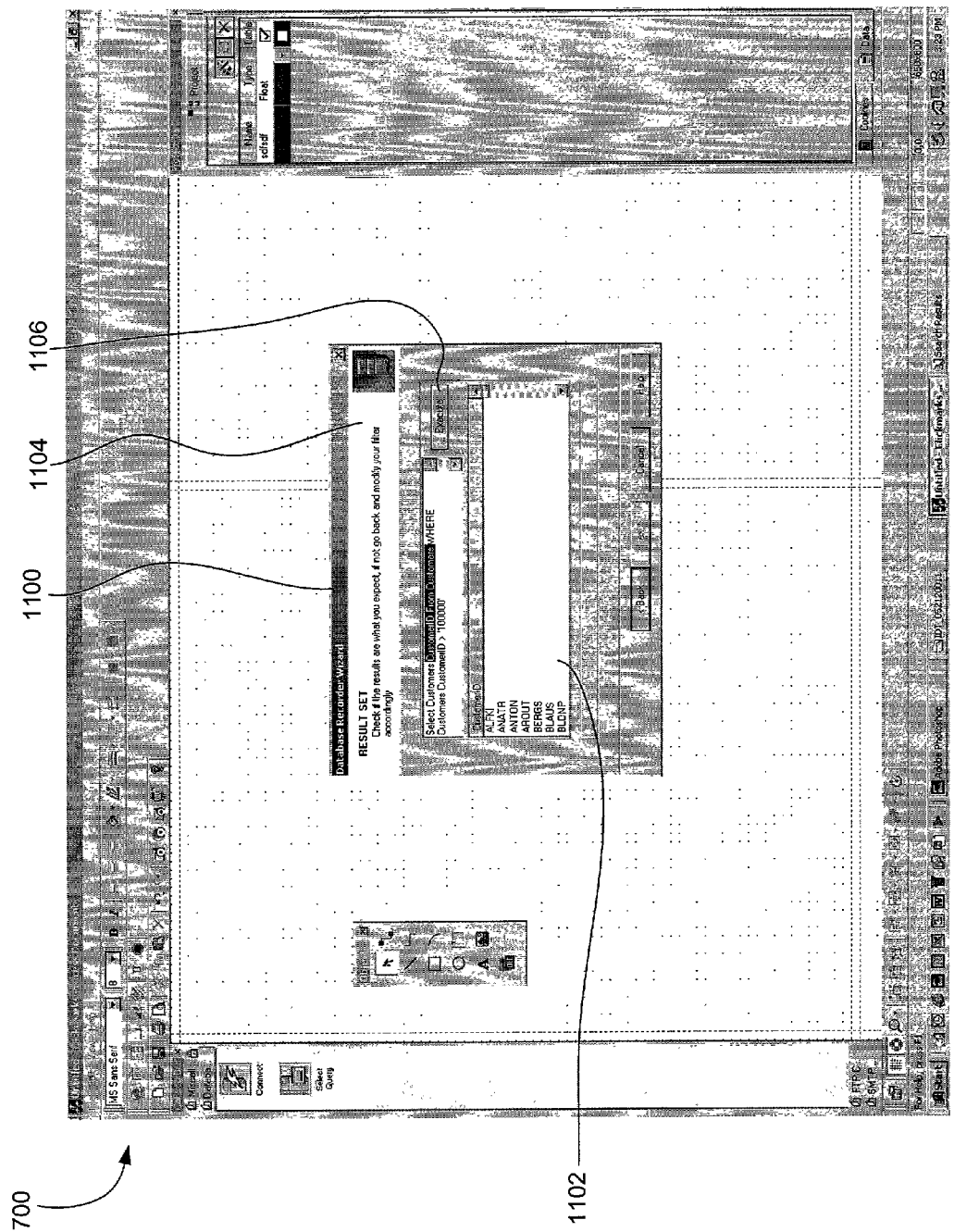
FIG. 11 illustrates a results screen of the interface of FIG. 7.

FIG. 11 illustrates a results screen 1100 displaying the results of the query in a results portion 1102. The query is also displayed in a query portion 1104. The query may be edited in the query portion to change the results returned. The Execute button 1106 is selected to re-execute the query and retrieve results of the edited query. The Next button is selected.

Figure 12:
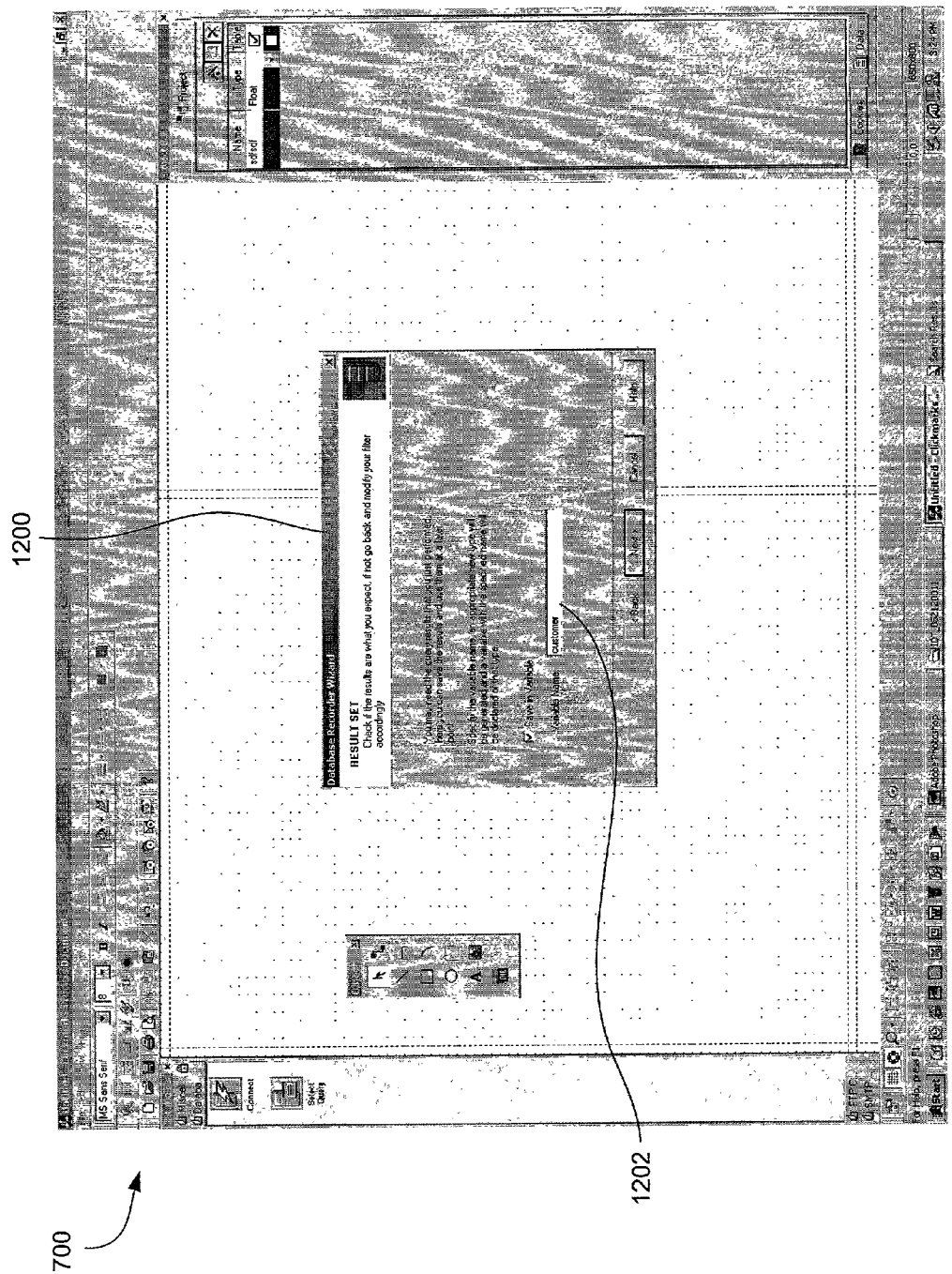
FIG. 12 illustrates an assign variable screen of the interface of FIG. 7.

FIG. 12 illustrates an assign variable screen 1200. Here, the results are assigned to a variable and saved for later use. The name of the variable is entered in the Variable Name field 1202. In this example, the variable is named "customer." The Next button is selected.

Figure 13:
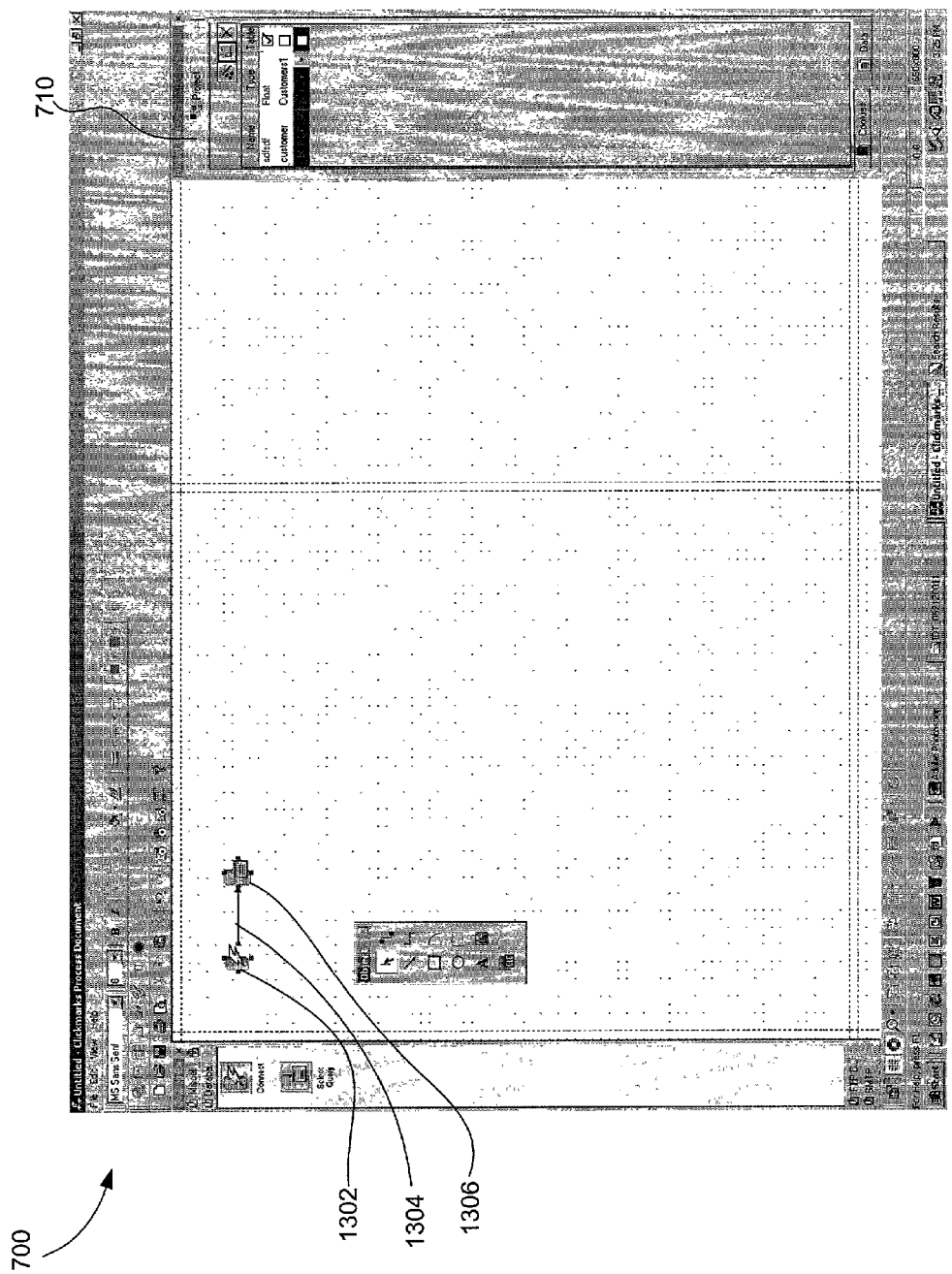
FIG. 13 shows the grid screen of the interface of FIG. 7.

FIG. 13 shows the grid screen 700. The new variable "customer" now appears in the Project Bar 710. A Database Connector 1302 is dragged from the Catalog Bar, as is a Select Query object 1304. A connector 1306 is dragged and dropped from the Object Bar to the grid screen and used to connect the Database Connector and the Select Query object.

Figure 14:
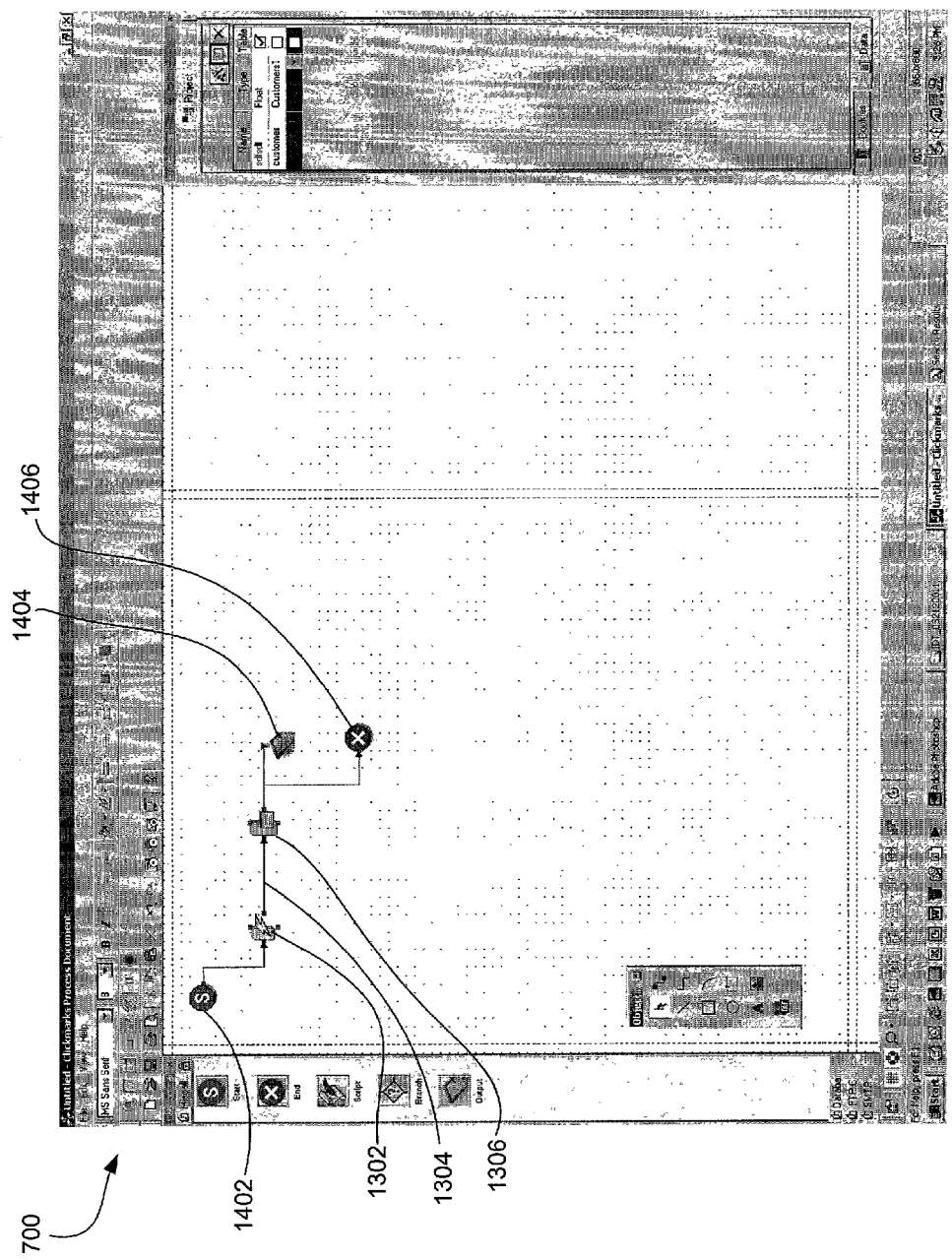
FIG. 14 shows the grid screen of FIG. 13 with additional objects added.

FIG. 14 shows the grid screen with additional objects added. Here, a Start Process object 1402, an Output object 1404, an End Process object 1406, and connectors have been added.

Figure 15:
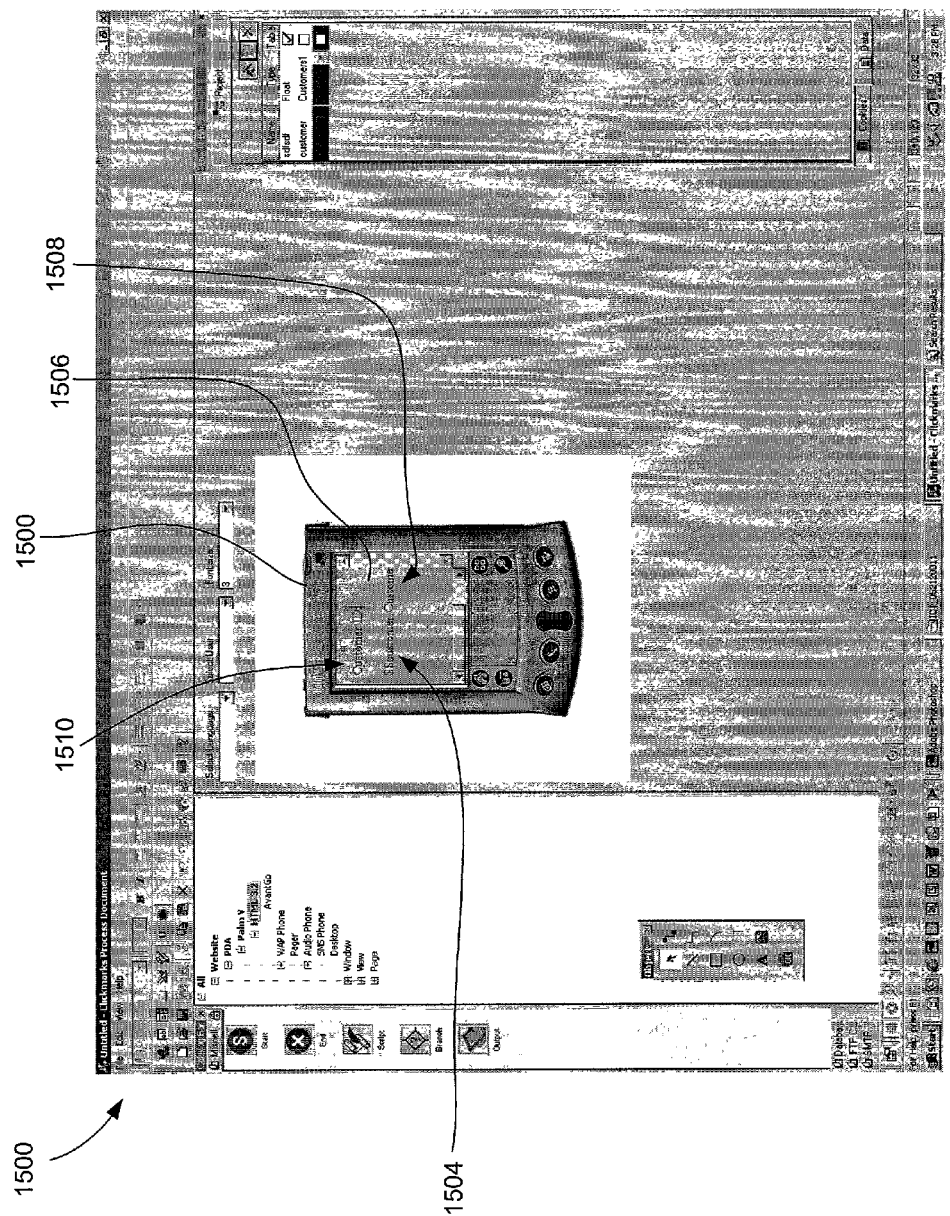
FIG. 15 illustrates a display specification screen of the interface of FIG. 7 from which the user can specify the manner in which variables are displayed on particular devices.

FIG. 15 illustrates a display specification screen 1500 from which the user can specify the manner in which variables are displayed on particular devices. As shown, various devices are shown in a tree structure. A type of device is selected, here the Palm V version of the PDA. A representation 1502 of the PDA is displayed. The identifier "customer" 1504 is added to the simulated display 1506 of the PDA. The variable field 1508 is also added to the display. During runtime, the actual result of the query is displayed in place of the identifier and variable field. Text may also be added for output in this screen. Here, the words "Customer ID:" 1510 have been added.

For example, a website may have a table having an output with five columns. On a PDA, perhaps only four columns can be displayed on the display. The output can be set to only show four variables. Similarly, if only two columns of the table can be displayed on a phone, the output van be set to show only two variables.

Pattern Replay Engine

The Pattern Replay Engine (PRE) is the component of the platform that is responsible for replaying a pattern from one particular state to another during runtime.

Figure 16:
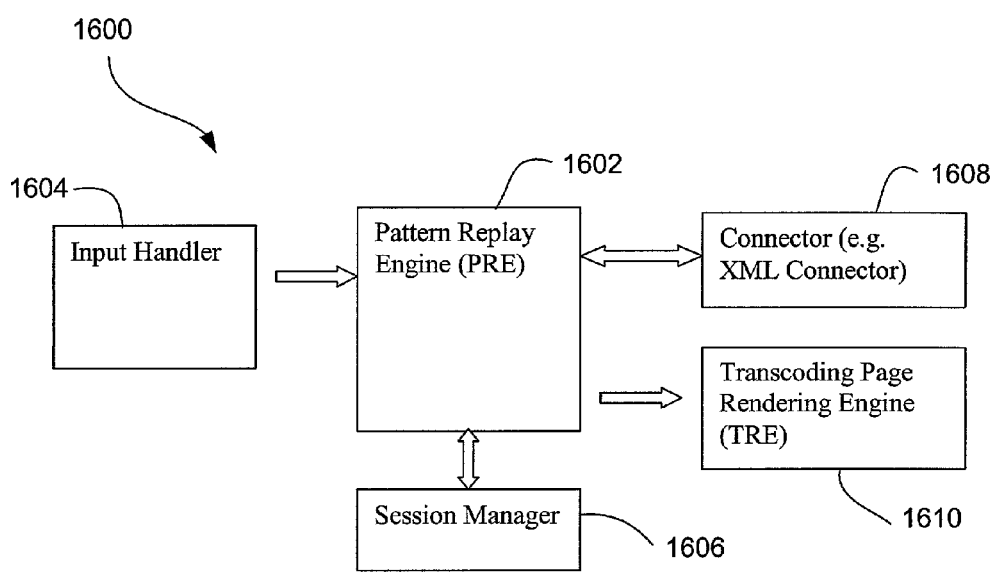
FIG. 16 gives a general overview of how the PRE interfaces with other major components of the system according to one embodiment of the present invention.

FIG. 16 gives a general overview of how the PRE 1602 interfaces with other major components including the Input Handler 1604, session manager 1606, connector b0008 (discussed in detail below), and TRE 1610.

The PRE is a request-driven component. The PRE takes the request to make a transition from a particular State. Transitions from one State to another are made by executing Actions. The PRE communicates with the appropriate Connector (of the current State) to execute the current Action in the request and get the new resulting State. Next, all Script associated with the State, except for OnDestroy( ), is evaluated.

The PRE then calls the Transcoding Page Rendering Engine (TRE) to "flush" its output to the device. This means that any Content, which has been queued for display in the TRE (while processing the request), is sent to the device. Every state can potentially generate output to be displayed on the device, including internal states. This is a desirable feature as it means the designer can send a status message to the device, e.g. "Please wait while processing . . . " etc. The TRE may have to be reset every time, i.e. after a "flush" which flushes any queued output to the device, the TRE has to be ready to start building up a whole new display.

Finally, the State's OnDestroy( ) script is called, which can initiate further State transitions from this script method if necessary.

Figure 17:
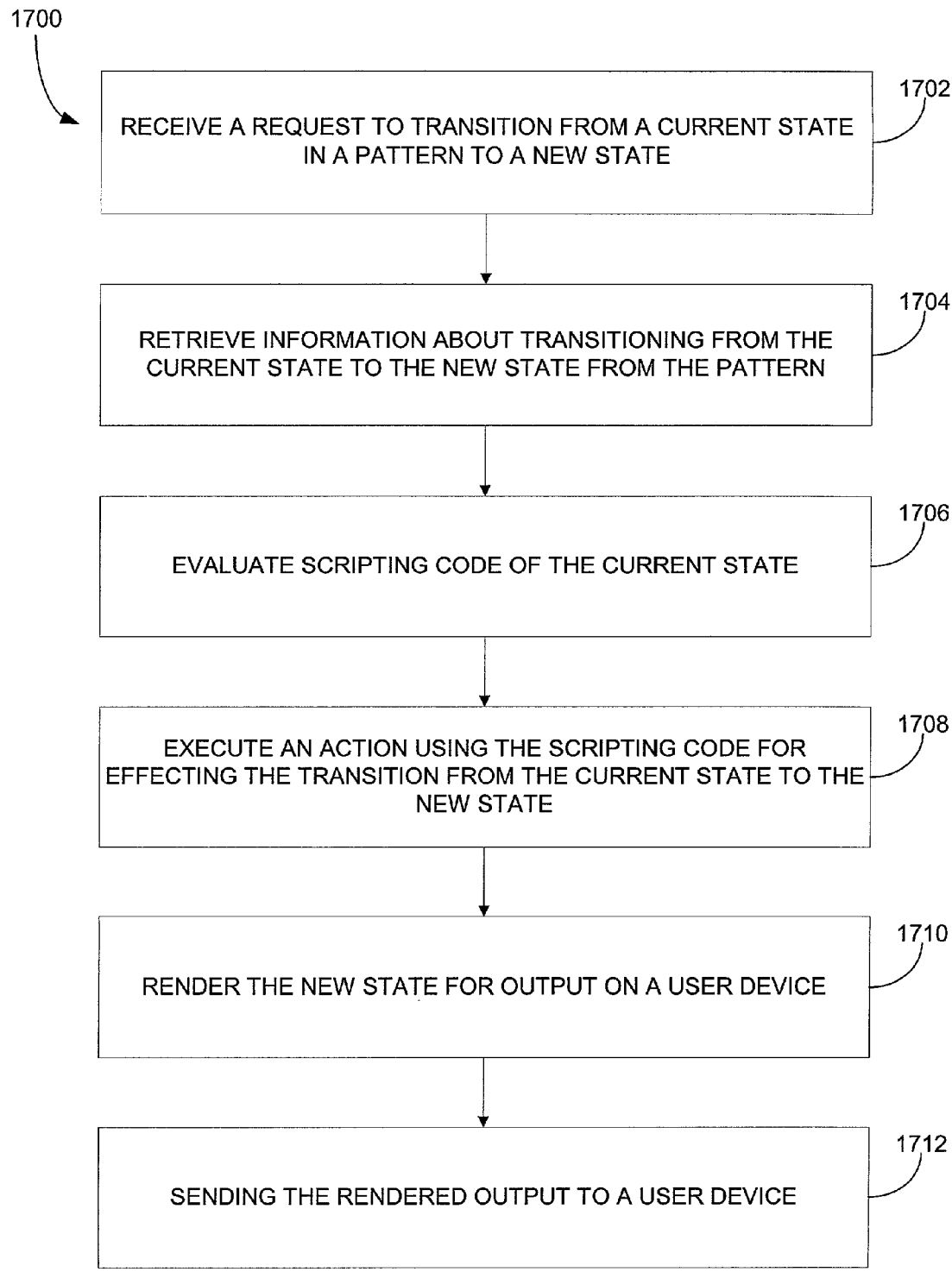
FIG. 17 is a flowchart of a process for replaying a pattern for transitioning from one state to another state, according to an embodiment of the present invention.

FIG. 17 is a flowchart of a process 1700 for replaying a pattern for transitioning from one state to another state, according to an embodiment of the present invention. A request to transition from a current state in a pattern to a new state is received in operation 1702. A state can be defined as the state of a remote application as defined by the user. A pattern is a collection of states to be used as one functional element in an application. In operation 1704, information about transitioning between the states from the current state to the new state is retrieved from the pattern. Scripting code of the current state is evaluated in operation 1706 to determine what action or actions are to be performed/executed in order to effect the transition to the new state. In operation 1708, an action (or actions) is executed using the scripting code for effecting the transition from the current state to the new state. An example of an action is clicking on a link. The new state is rendered and output to a user device in operation 1710 and 1712, respectively.

Preferably, the action is executed by communicating with a connector in communication with the appropriate state for executing the action. Also preferably, each type of state has a dedicated connector.

In another aspect of the present invention, each of the states generates output for display on the user device.

In a further aspect of the present invention, a further state transition is initiated and the process is repeated. Preferably, a history of states in the pattern that been traversed is maintained. Ideally, a state traversed out of sequence is detected. If it is determined that the incoming request is "out of Step", then a determination is made as to what point in the history the request is coming from. Then a special Back event is sent to the appropriate Connectors in order to "back up" to that State. For example, Step 1 could represent the login page for Yahoo mail. The user then proceeds to the Inbox page (Step 2), and subsequently to a specific mail message (Step 3). If the user clicks "Back" twice on their device browser, the browser could simply render the cached pages for Step 2 and Step 1. Then the user could initiate another login from Step 1. The present invention would detect that the user has gone back in sequence (since the Step ID is part of the request) and would respond as described above.

In one embodiment of the present invention, the transaction pattern may include a record of: information submitted by a user, actions taken by the user, actions taken by a system to generate results, and results sent to the user. As an option, the transaction pattern may include a record of actions taken by the system which enable access of the user to data, and actions enabled by the data to retrieve content. Storage may take any form with sufficient identification and description of any required step in the transaction process.

Figure 18:
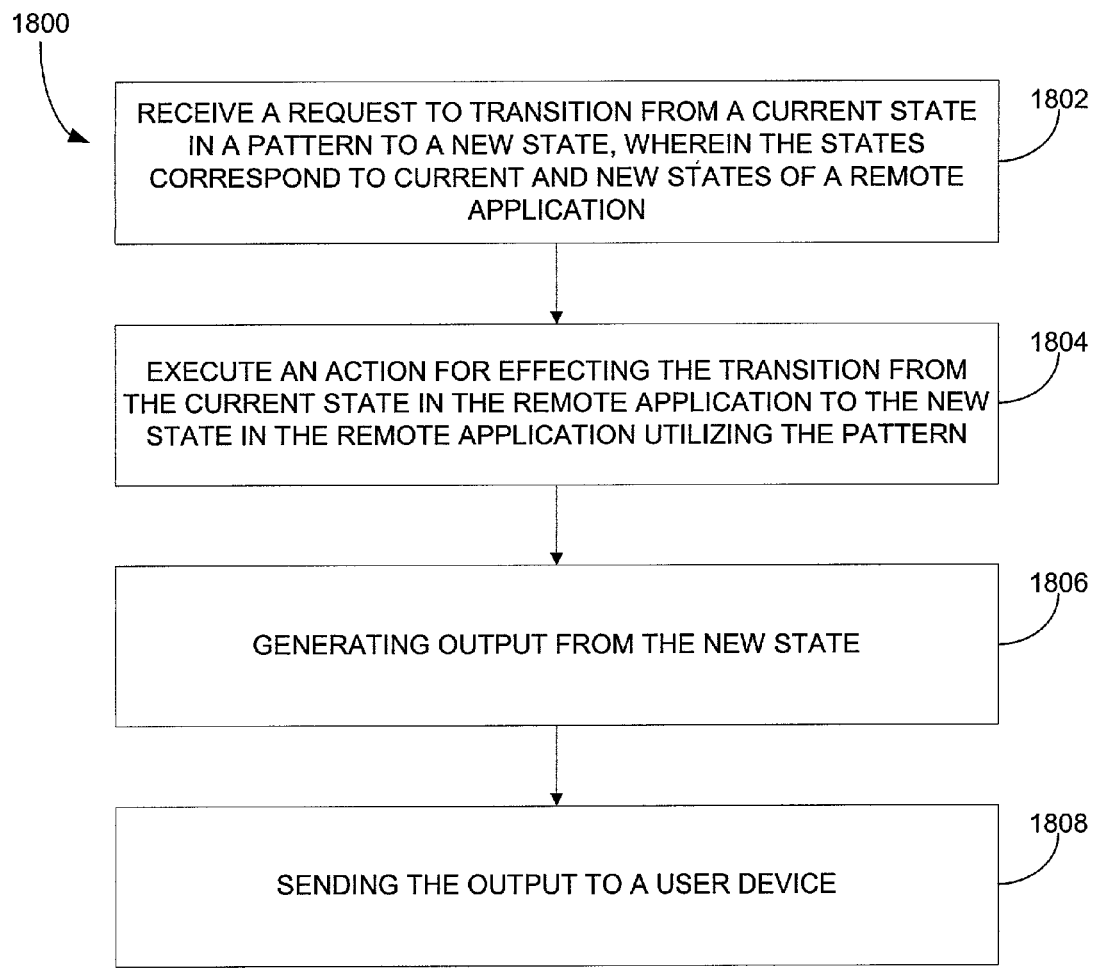
FIG. 18 depicts a process for replaying a pattern for transitioning from one state to another state in a remote application, according to another embodiment of the present invention.

FIG. 18 depicts a process 1800 for replaying a pattern for transitioning from one state to another state in a remote application, according to another embodiment of the present invention. In operation 1802, a request to transition from a current state in a pattern to a new state is received. The states correspond to current and new states of a remote application. In operation 1804, an action is executed for effecting the transition from the current state in the remote application to the new state in the remote application utilizing the pattern. An example of an action is clicking on a link. Note that the action can be executed by a user or by script. An output from the new state is generated and output to a user device in operations 1806 and 1808.

In one aspect of the present invention, the action is executed by communicating with a connector associated with the state for executing the action. Preferably, each type of state has a dedicated connector. Also preferably, each of the states generates output for display on the user device.

A further state transition can be initiated. Likewise, a history of states in the pattern that been traversed can be maintained. Preferably, a state traversed out of sequence is detected.

During use of the present invention, such transaction pattern may be retrieved from memory when desired. Thereafter, the transaction pattern is executed to carry out the transaction in an automated manner. An execution, or playback may include the invocation of a stored transaction pattern.

The various operations that may occur during execution of a transaction pattern may involve: (i) a direct or indirect retrieval of the transaction pattern by an automated and/or programmable agent, i.e. a computer server/client, an active or dormant program, a human being, etc. (ii) an automatic or user prompted submission of the required parameters in every step of the transaction process, (iii) the automatic navigation within the transaction process, (iv) a retrieval of the content returned by the system or specified by the user, and/or (v) the relaying of the content back to the user.

Figure 19:
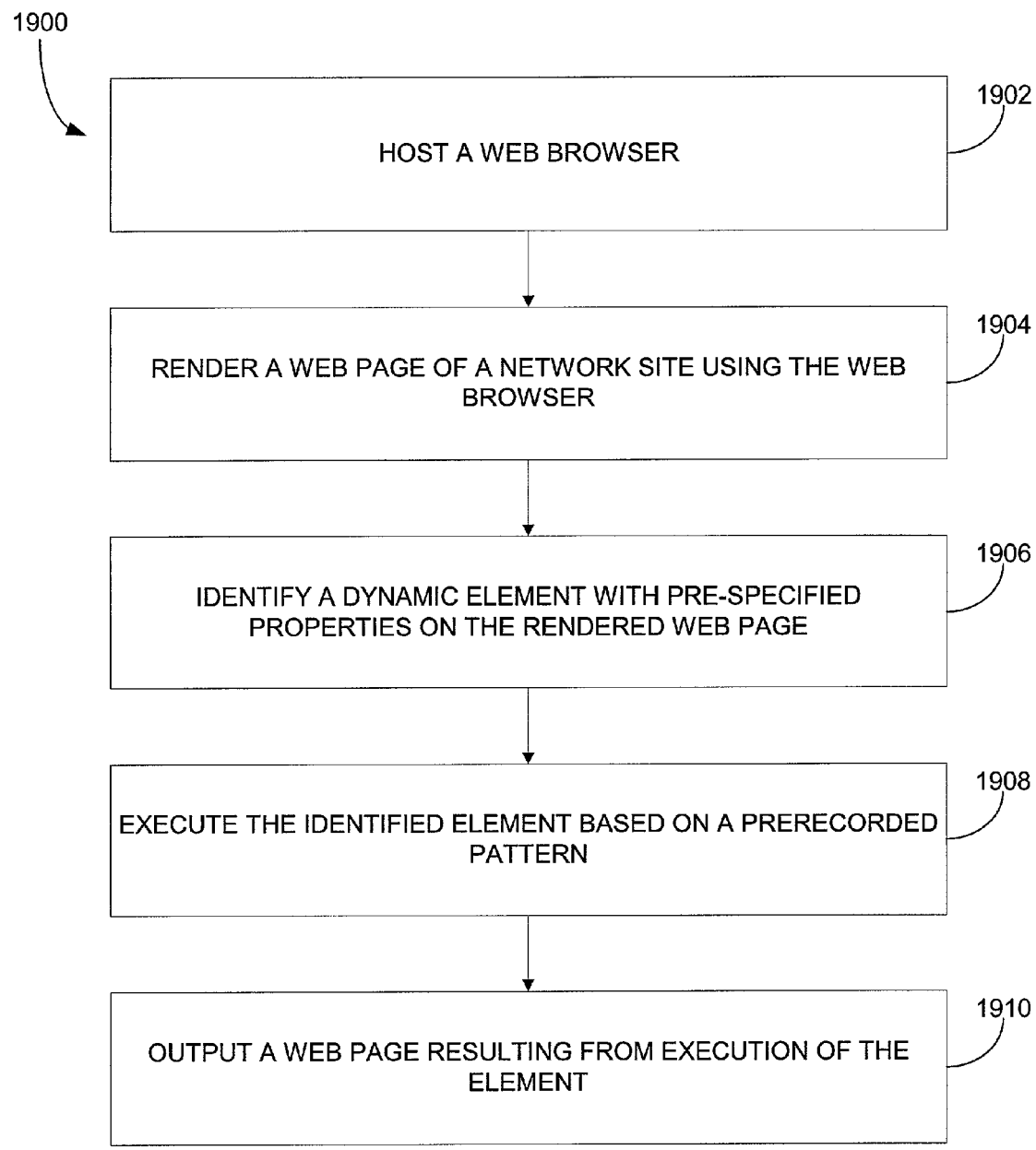
FIG. 19 is a flowchart of a method for identifying a dynamic element and replaying a dynamic event according to an embodiment of the present invention.
Figure 20:
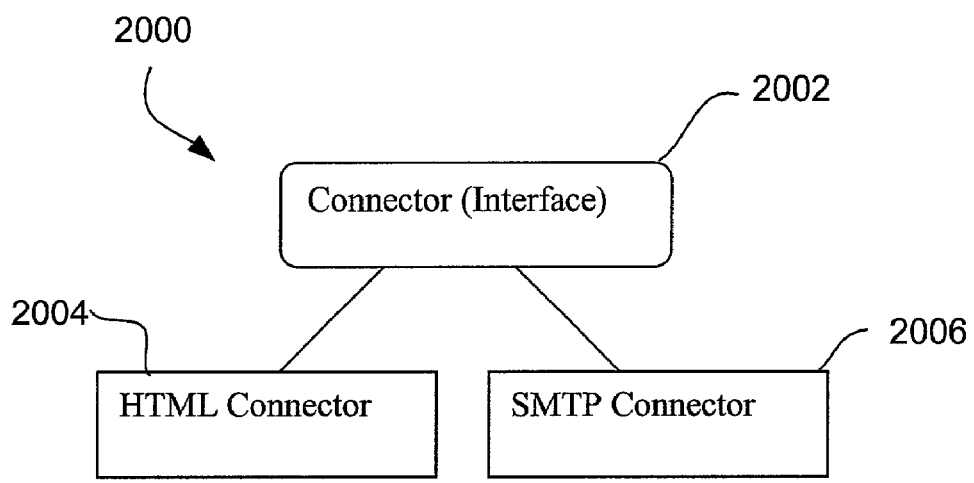
FIG. 20 illustrates a Connector class hierarchy according to one embodiment of the present invention.

FIG. 19 is a flowchart of a method 1900 for identifying a dynamic element and replaying a dynamic event according to an embodiment of the present invention: This method is preferably carried out by the User Agent in conjunction with the Pattern Replay Engine and State Recognition Module. A web browser is hosted in operation 1902. In operation 1904, a web page of a network site is rendered using the web browser so that it is in the form the user would see it. This allows the User Agent to identify dynamic elements based on its visual properties, including text labels, positioning, etc. A dynamic element with pre-specified properties is identified on the rendered web page in operation 1906. Such an element could be a "Buy" button on the web page. In operation 1908, the identified element is executed based on a prerecorded pattern. A web page resulting from execution of the element is output in operation 1910. This method overcomes the disadvantages of attempting to understand the source (e.g., HTML) of the content. Rather, particular elements can be identified by their properties, even though the elements have changed form. For example, the "Buy" button may have changed to a different type of icon or even an animated graphic. Regardless, the present invention is able to identify the element and execute it. More information regarding pattern recording and replay is provided in co-pending Provisional U.S. patent application entitled SYSTEM, METHOD AND COMPUTER PROGRAM PRODUCT FOR THE RECORDING AND PLAYBACK OF TRANSACTION MACROS, filed Apr. 12, 2001 under Ser. No. 60/283,781 and assigned to common assignee, Clickmarks, Inc., and which is incorporated herein by reference Connector Plugin Support FIG. 20 illustrates a Connector class hierarchy 2000. The Platform uses Connectors to provide specific functionality for interacting with a remote application. See State Recognition Module and Connector below. A standard interface 2002 is defined for the Connector and its associated classes 2004, 2006 such as Connector-specific State information classes.

Figure 21:
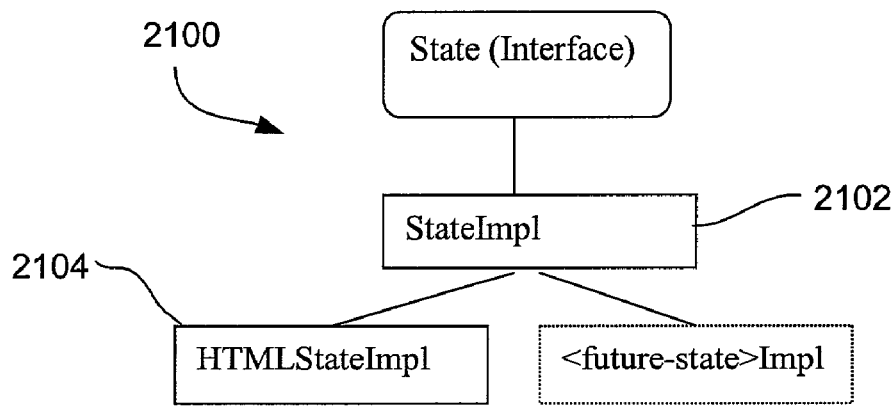
FIG. 21 depicts a State class hierarchy according to one embodiment of the present invention.

FIG. 21 depicts a State class hierarchy 2100. In the XML description of the Pattern, all possible States are defined, including State information which is generic and State information which is specific to the Connector.

An interface 2100 is defined. A public StateImpl (implementation object) 2102 is provided to subclass from. All Connectors have a "createState( )" method which creates a State object which is specific to the Connector. This makes the design clean so that the PRE does not need to instantiate Connector-specific State objects (e.g. HTMLStateImpl 2104) itself.

Scripting

The PRE evaluates scripting code associated with each State. The user's script can be written in JavaScript (which is specified by the designer using the IDT). The script has access to the Platform's Scripting API.

Script Event Methods

There are five preferred Scripting methods which are called when a State is entered:

OnInit( . . . ): method called when the PRE first enters the State. Used to perform any initial processing.

OnData<contentID>( ): group of methods called to extract and manipulate the content Data retrieved by the Connector as it becomes available. There is a separate 'OnData' function for each content data item of interest. Each JavaScript function name is distinguished by a suffix consisting of the content ID. Using the Scripting API, the Data can be stored in Variables and/or in Content UI objects for rendering on the device.

OnDataComplete( ): single method called when all the data content retrieval has been completed.

OnDestroy( ): last script method called. Typically used for cleanup and to explicitly execute one or more Actions and/or to initiate a State transition (using the Scripting API). See the Executing Actions Via Script section for more details.

OnError( ): method called when PRE is unable to normally process the State for any particular reason. (It does not get called when an Action-execution results in a new State—in this case, the 'catch' code within the script gets called.)

Invoking the Transcoding Page Rendering Engine (TRE)

The TRE's 'flush' method is called to output to the device any content that has been rendered. This method is called every time a State transition occurs. Specifically, it is called after the OnDataComplete( ) method but before the OnDestroy( ) method.

Executing Actions Via Script

In the OnDestroy method, the user can explicitly execute an Action.

Exposed Scripting Functionality

In addition to having the core JavaScript language available, the Scripting code can take advantage of powerful functionality via the Scripting API and by importing and calling methods on special Scripting objects provided by the PRE.

Scripting API
  Variable Access
    variable retrieval—reading in User, Session, and Application variables
    variable storage—writing out User, Session, and Application variables
  Pattern Flow Control Methods
    Action execution—executing any Action within the current State
    State transition—jumping to any State within the current Pattern
Importable Java Objects
  Data Retrieval: (Class: DataRetrieval)
    provides access to the Data of interest associated with the current State.
  Content Object
    allows script to put data into a Content Object, which in turn has a render method which can be called to output the Content Object to the device.

Variable Management

The PRE handles requests to read and write out Variables. These requests occur from within the scripting code (See Scripting API). The requests can be for any of the three different types of Variables: User, Session, and Application. Variable read/write requests are initiated from the scripting code. The scripting code gains access to these variables through the ScriptingAPI's "Variable Access" methods. (See Scripting API section.)

Pattern Replay Engine Tasks

Accepting the Request

The PRE accepts requests from the Input Handler (e.g. HTTP Input Handler). The PRE receives the Pattern ID, Step Number, Event ID, and the data parameters to successfully process the request. The data parameters are passed in a Java Hashtable object containing name-value pairs.

Determining Corresponding State from Step Number

The PRE maintains a history of the States in the Pattern that have been traversed as a monotonically increasing sequence of Steps. The PRE maintains a mapping between each Step and its corresponding State.

Detecting a Step Number out of Sequence

Since the request given to the PRE contains the Step Number of the originating State, the PRE determines whether the user is traversing the States in a linear fashion, or if the user has gone "back" in the history of Steps, by comparing the request Step Number with the Step Number of the last-traversed State. If the user has gone "Back" in the sequence, this is a special case. See the Going Back in Sequence section.

Retrieving the Session

The PRE communicates with the SessionManager to obtain the Session object for a request. This Session object contains a PatternContext in particular, which is discussed below.

Maintaining the PatternContext

The PatternContext object is contained within the Session object. It represents the runtime information associated with a particular Pattern and Session, including the current Step number, the mapping between Steps and States, the collection of Connector objects, and the Session variables. The PRE keeps the PatternContext up-to-date and stores it persistently (via the SessionManager) by storing the Session object that contains it.

Retrieving the Pattern, State, and Script

The Pattern object contains all of its State objects. The PRE requests the specified State from Pattern object by passing it a State ID.

The State object contains a Script object, which represents the scripting code that is associated with the State. (There is only one Script object per State object.) The PRE requests the Script object from the State object.

Instantiating the Connector

Each State can only be handled by one particular type of Connector. Each Connector is instantiated only as needed since a Pattern may never branch to a particular Connector.

The PRE asks the State object what type of Connector to use. The PRE first tries to retrieve the Connector from the PatternContext object if it already exists. If the Connector has not yet been instantiated, the PRE calls a createConnector method, passing it the type value and Pattern reference to associate with the Connector. The createConnector function creates the appropriate Connector subclass instance which corresponds to the specified type and returns it to the caller (the PRE).

Extracting Connector-Specific Data

The XML definition of each State within a Pattern contains information that is Connector-specific. The PRE does not need to be able to interpret this Connector-specific information; it simply needs to pass this information (for each State) to the Connector when an Action is to be performed. (See Invoking the Connector.)

Invoking the Connector

The PRE invokes the Connector (determined above) by calling its executeAction( . . . ) method. This method takes the Action and a Hashtable of data parameters as name-value pairs. The Connector has access to the Pattern using a reference passed during the Connector's construction. The Connector only has access to the Connector-specific Pattern information pertinent to this particular Connector subclass instance. For example, the XML Connector stores State-property information within the Pattern which is specific to the XML Connector only. The Connector returns an ActionResult object which has methods to get the resulting State ID and retrieve all of the content data items of interest. If any errors occur (such as not being able to process the Back event), an exception is thrown within the executeAction method.

Predetermined Transitions Between States

At design time, the user can specify a State transition that should be performed after a State's script code has finished evaluating, called a predetermined State transition. The IDT specifies this in the Pattern XML. The PRE recognizes such a predetermined State transition in the XML and performs the transition after all other script code (not including OnError) has been evaluated for this particular State. And unlike State transitions which are specified in the script code, predetermined State transitions are preferably implemented directly from the PRE's own Java code, not JavaScript.

Evaluating Script

Assuming no error occurred while performing the transition, the PRE evaluates script associated with the new resulting State. See the separate Scripting section for details.

Going Back in Sequence

If the PRE has detected that the incoming request is "out of Step", then it finds at what point in the history the request is coming from. Then it sends a special Back event to the appropriate Connectors in order to "back up" to that State. For example, Step 1 could represent the login page for Yahoo mail. The user then proceeds to the Inbox page (Step 2), and subsequently to a specific mail message (Step 3). If the user clicks "Back" twice on their device browser, the browser could simply render the cached pages for Step 2 and Step 1. Then the user could initiate another login from Step 1. The PRE would detect that the user has gone back in sequence (since the Step ID is part of the request) and would respond as described above.

Scripting

The user can specify script to be evaluated when a State is encountered. (This script is specified using the IDT.) Using script (which is specifically JavaScript), the user has access to the Platform's Scripting API and Scripting Java objects. The Functionality section describes the functionality that is exposed.

Scripting Implementation

Figure 22:
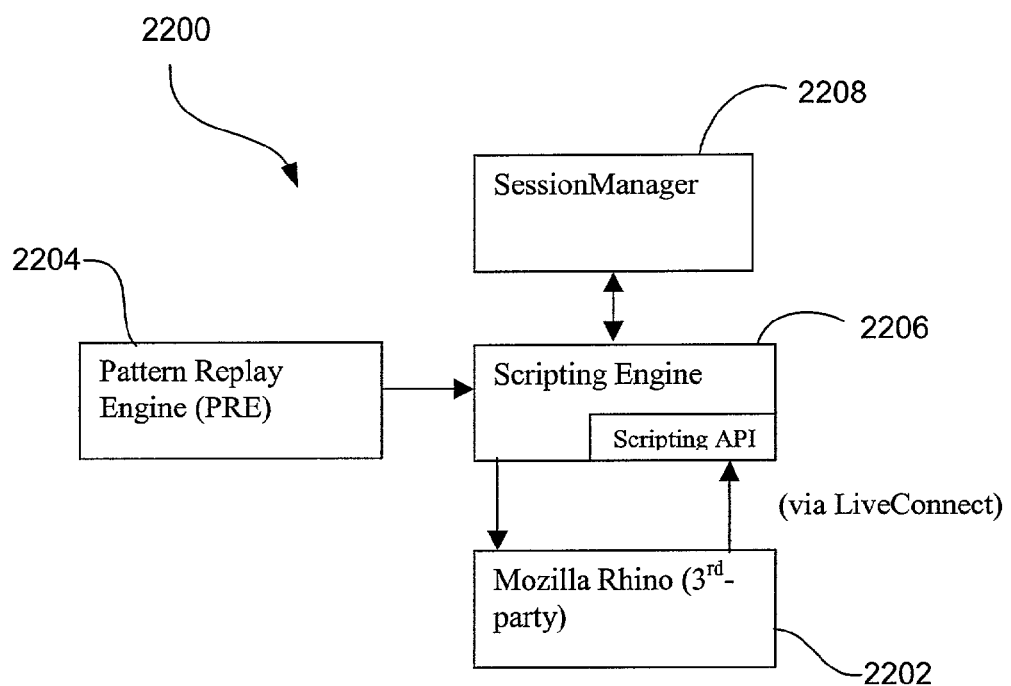
FIG. 22 is a diagram illustrating how different components of the present invention can interact to support Scripting.

FIG. 22 is a diagram 2200 illustrating how different components interact to support Scripting. PRE preferably supports JavaScript scripting using an open-source platform 2202 from Mozilla called Rhino. Rhino is Mozilla's Java implementation of the core JavaScript language. Using Rhino, the PRE 2204 can evaluate JavaScript from within Java objects. In addition to the core language, Rhino has implemented JavaAdapters, which allow JavaScript to implement any Java interface or extend any Java class with a JavaScript object.

The Scripting Engine 2206 receives a request to evaluate a particular script inside a Script object. The Scripting Engine receives a reference to the content DOM tree so that the JavaScript can manipulate it. The Scripting Engine communicates with the Session Manager 2208 to fulfill any Variable read/write requests that it made available via the Scripting API.

State Recognition Module and Connector

The XML Connector is a 'state-keeping' connector. That is, it is always in some specific state. That state corresponds to some state of the remote application (see Glossary). A transition from one XML state to another cannot usually be made, unless it is done by using an "action" that will change the state of the remote application and thus change the state of the connector accordingly.

The XML Connector identifies a remote state by the output provided by the remote application in that state. In fact, the remote application may have much more information about its current state then what it displays to its users. Thus, a distinction can be made between a local state ("state")—which will refer to the state assigned by the user to the remote application state—and the actual remote state. The transition from one remote state to another is a function of the user input and the state of the remote application. Since the XML Connector does not have all information about the remote state, it cannot accurately know what the next state of the remote application will be, until the remote application provides output corresponding to that state. Moreover, if at one time certain user action in state A caused the remote application to transition to state B, it does not follow that the same transition will occur the next time the same user action is executed in state A. In light of the above discussion, the replaying mechanism preferably recognizes the state by its current output, not by the previous state and transition. This is done with the help of the State Recognition Module (SRM). The SRM creates a state's "output structure" description for a state and then uses that description during replay to recognize a state. The term "output structure" refers to the window and frame structure of the output from the remote application. The output structure description contains the information about how many windows were presented to the user at a given state in remote application and how many frames were in each window and the nesting structure of those frames. (SRM uses the CRM to recognize individual documents in a document structure.)

Functionality

Figure 23:
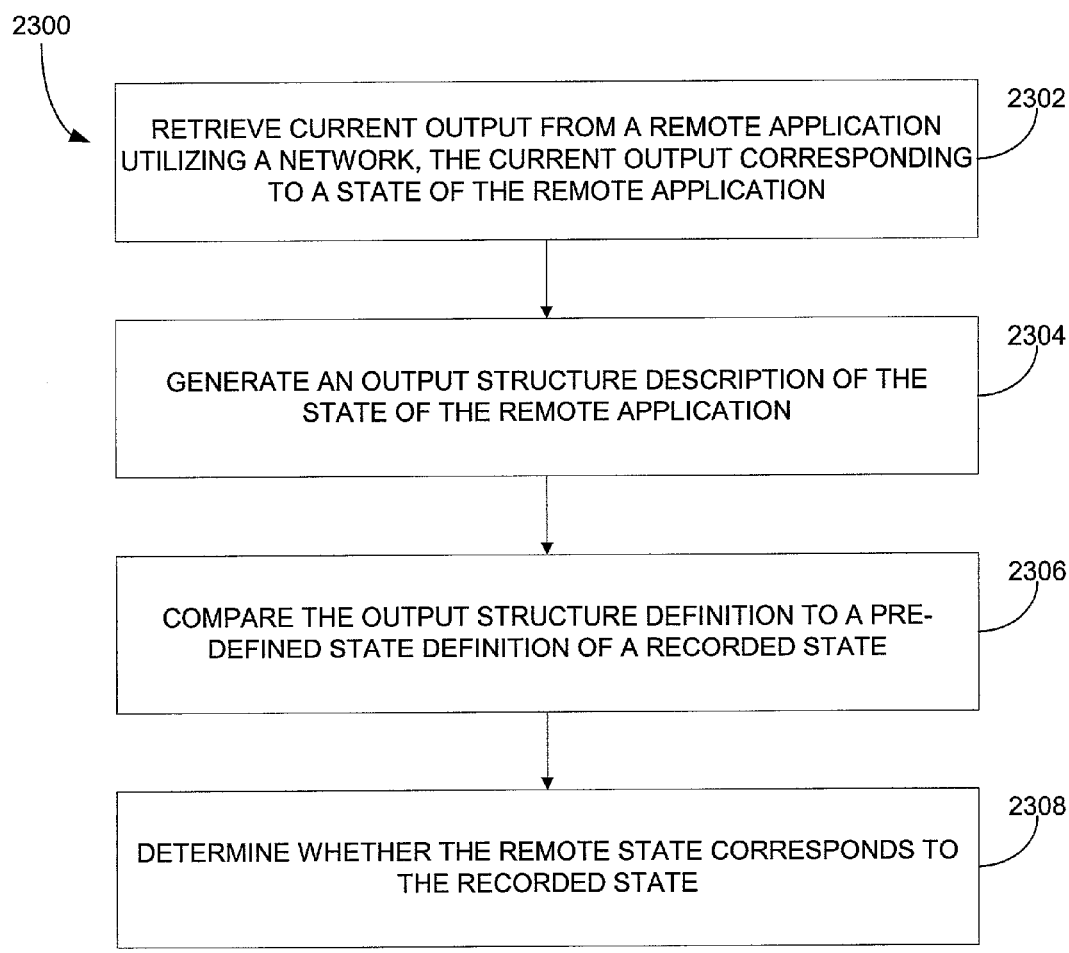
FIG. 23 depicts a process for recognizing a state based on a current output, according to one embodiment of the present invention.

FIG. 23 depicts a process 2300 for recognizing a state based on a current output, according to one embodiment of the present invention. In operation 2302, current output is retrieved from a remote application utilizing a network, the current output corresponding to a state of the remote application. An output structure description of the remote state is generated in operation 2304. The output structure description is preferably of a window and frame structure of the output. The output structure definition is compare to a pre-defined state definition of a recorded state (called a state description) in operation 2306. In operation 2308, a determination is made as to whether the remote state corresponds to the recorded state. Note that the recorded state definition is created during recording of the pattern.

As an option, predefined information (e.g. a StateData Object) about the remote state can be returned if the remote state corresponds to the recorded state. The predefined information can then be used to extract data from the remote application.

In one aspect of the present invention, the output structure definition includes a number of windows presented in the remote state, a number of frames in each window, a nesting structure of the windows, and/or a nesting structure of the frames. Preferably, the recorded state is part of a pattern pre-recorded by a user. In yet another aspect of the present invention, content of the remote output is recognized based on recorded content properties and used to help recognize the state. Preferably, the recognized content is utilized for recognizing the state based at least in part on a weighted average of content recognition and content importance. Note that the content can be one or more documents, one or more content items in a document(s), etc.

Figure 24:
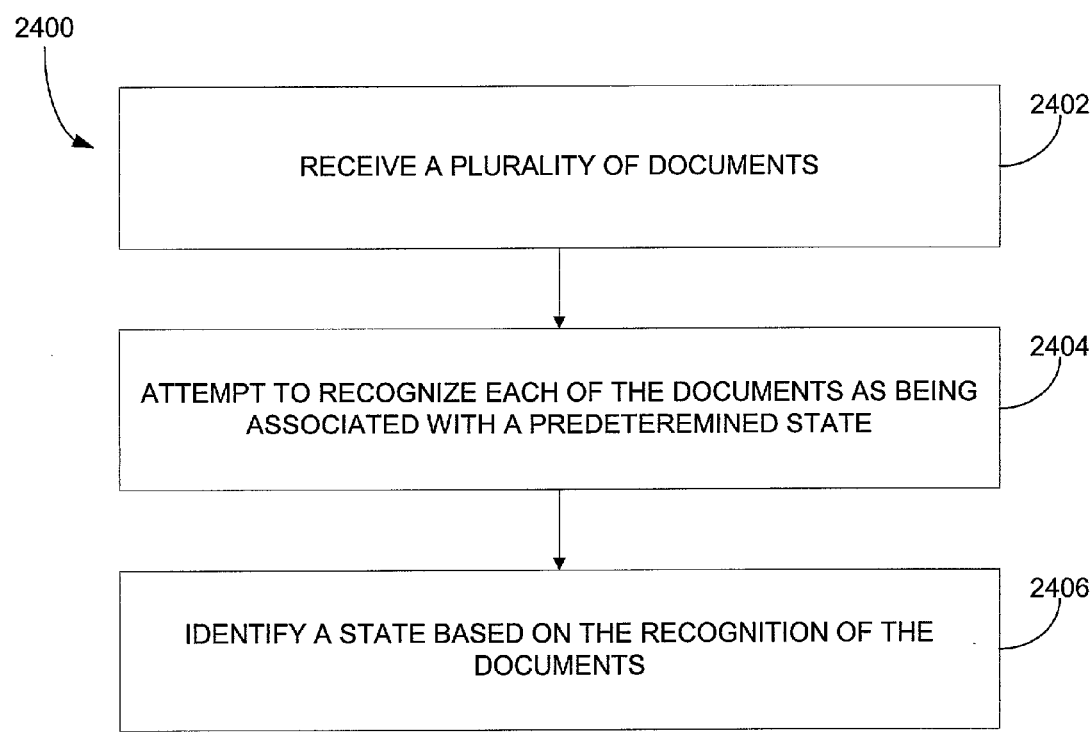
FIG. 24 is a flow diagram of a process for recognizing a remote state utilizing individual document recognition, according to another embodiment of the present invention.

FIG. 24 is a flow diagram of a process 2400 for recognizing a remote state utilizing individual document recognition, according to another embodiment of the present invention. This embodiment identifies the state of a site or page by the content of its content (such as documents) instead of (or in addition to) the layout structure of these documents. In operation 2402, a plurality of documents are received. An attempt to recognize each of the documents as being associated with a predetermined state is made in operation 2404. In operation 2406, a state is identified based on the recognition of the documents.

A Content Recognition Module (CRM) can be used to recognize states. Basically the state consists of a bunch of documents, each one of which is first recognized by the CRM. If the state consists of documents A, B and C, then if the CRM recognizes all of A, B and C from the documents given it by the SRM, the state is recognized. Otherwise, if the CRM recognizes a different set of documents, then the state is recognized as the state containing that set of documents, or no state is recognized if no state corresponds to that set of documents, the pattern is placed in an error state.

Figure 25:
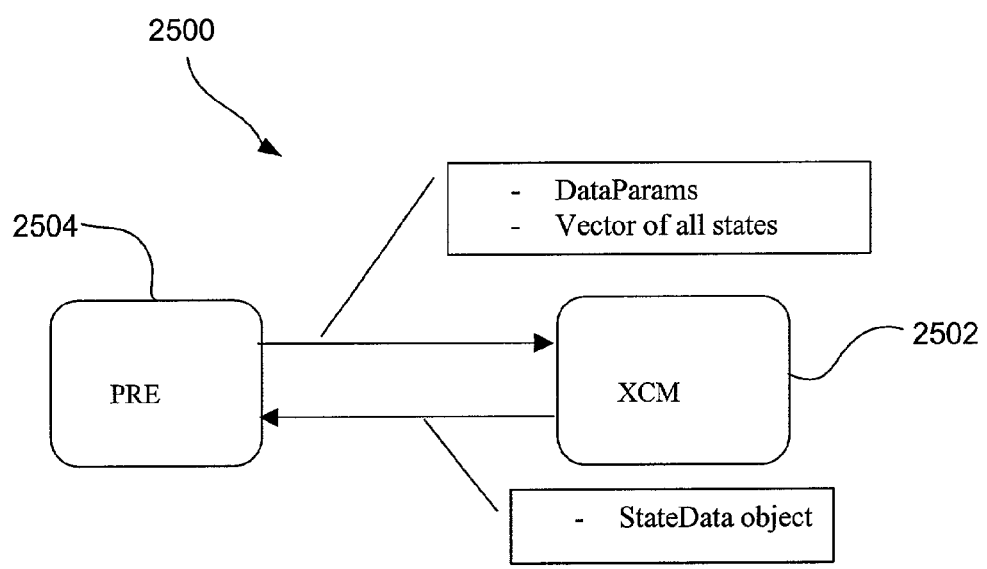
FIG. 25 is a flow diagram that illustrates the interaction between the XML Connector Module (XCM) and the Pattern Replay Engine (PRE).

FIG. 25 is a flow diagram 2500 that illustrates the interaction between the XML Connector Module (XCM) 2502 and the Pattern Replay Engine (PRE) 2504. As discussed above, the PRE performs the task of replaying (executing) a pattern at run-time. It goes through each state of the pattern, and depending on the type of the state invokes the appropriate connector. The XML Connector Module (XCM) is invoked to execute XML states. Its input is the request parameters (DataParams) and definitions for all possible XML states in the current pattern, and it outputs a StateData object, which can be used to obtain information about the next state and the desired data elements.

Figure 26:
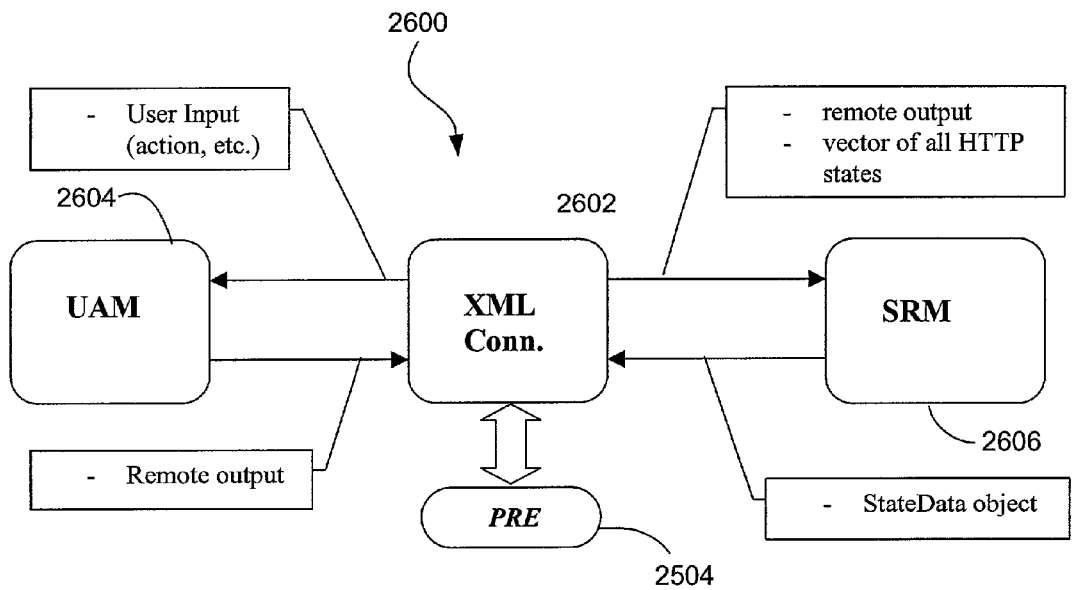
FIG. 26 is a flow diagram of the operation of the XML Connector.

FIG. 26 is a flow diagram 2600 of the operation of the XML Connector 2602. The request parameters contain the action to be executed and other element changes caused by the end user (such as filling out a form field). This information is sent to the User Agent Module 2604, so that it fetches the output of the resulting remote state. That output is then sent to the SRM 2606 so that the current remote output can be matched to a state definition created during design time. The SRM accepts the output of the remote state and the properties of all possible local states to which this remote state can correspond. If the remote output is recognized as one of the recorded states, a StateData object is returned which contains the information about the recognized state and can be used to extract the desired content and other information stored during recording.

At design-time, the XML connector is not used, because the task of fetching the output of the remote application is performed directly by the Interactive Design Tool (IDT), which is the user interface for the pattern recording. However, the IDT may still use the SRM to create state definitions for pattern states. These state definitions contain the information that is used later during replay to identify remote states and match them to local states (which are defined by these state definitions).

Figure 27:
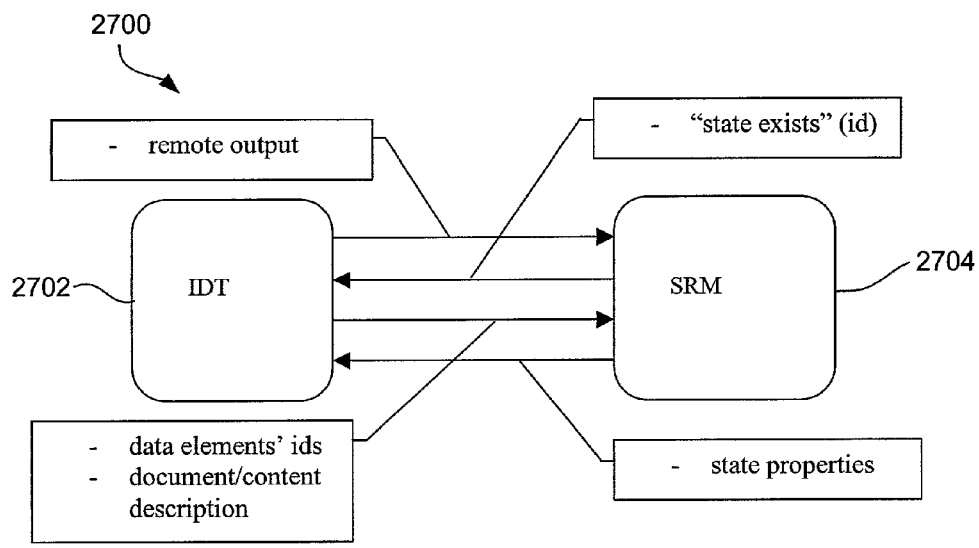
FIG. 27 is a flow diagram of SRM and IDT interaction.

FIG. 27 is a flow diagram 2700 of SRM and IDT interaction (requests executed from top to bottom). During design time, the IDT 2702 sends requests to the SRM 2704 to calculate state properties for some remote output. That request contains the remote output XML, the element id's for XML elements of interest in that output and the document and content descriptions created by the user to aid in identifying documents and content elements. After analyzing the state structure, the documents and the content elements, SRM returns to the IDT the properties, which are used during run-time to identify the state. If a state with the same structure and document properties already exists, this information is returned to IDT to fetch more information from the user on differentiating the state from the other similar state (if that is desired).

Besides calculating the state properties, the SRM is also able to identify if the new XHTML output matches any of the existing state properties for a previously defined state. This allows identification of any identical states in the pattern, which may be difficult to differentiate at run-time. It will also aid the designer if a state is to be edited after being recorded initially. That is, if the designer points the IDT browser to a remote state that was already identified, the system will recognize that this is an already existing state and will let the designer modify content and actions at that state.

In one embodiment of the present invention, the interaction between the IDT and the SRM proceeds as follows. Once the designer loads the XHTML output for a given remote state into the IDT browser, that XHTML is sent to the SRM to compare against the properties of the states that already exists in the pattern (unless no states exists). If the XHTML matches one of the state properties, the state id for that state is returned.

Once the user has identified all the content of interest in a state and has executed an action that causes a state transition (DOM modifying action or page transition action), the element ids are sent to the SRM to create content properties.

The following is a sample interaction between the SRM and IDT:

IDT:

Add A State (check existence):

```
<SRM:STATE id="2">
    <SRM:DOC id="21" type="window" rank="necessary">
        <SRM:DOC id="211" type="frame" rank="necessary">
            <SRM:DOC id="2111" type="frame" rank="necessary">
                <HTML>...</HTML>
            </SRM:DOC>
            <SRM:DOC id="2112" type="frame" rank="necessary">
                <SRM:DOC id="21121" type="iframe" rank="ignore">
                    <HTML>...</HTML>
                </SRM:DOC>
                <HTML>...</HTML>
            </SRM:DOC>
            <HTML>...</HTML>
        </SRM:DOC>
        <HTML>...</HTML>
    </SRM:DOC>
</SRM:STATE>
```

CRM:

<CRM:RESP status="ok"></CRM:RESP>

IDT:

Add content to state.

```
<CRM:DESCR docid="2111" markup="markup.crm">
    <CRM:EL id="e42" rank="high">
        <CRM:PROP class="???" rank="normal" border="0"/>
    </CRM:EL>
</CRM:DESCR>
```

CRM:

<CRM:RESP status="ok"></CRM:RESP>SRM:

<SRM:RESP status="ok"></SRM:RESP>

IDT:

Add content to state.

```
<SRM:STATE id="2" status="new">
    <DOCUMENT id="21" url="http://www.yahoo.com">
        <CONTENT id="23" rank="necessary">
            <PROPERTY class="ATTR_DEF" rank="necessary">
                <PARAM name="href" value="http://mail.yahoo.com">
                </PARAM>
            </PROPERTY>
        </CONTENT>
    </DOCUMENT>
    <EVENTSTREAM>
        <EVENT id="1">
            <ACTION>ONCLICK</ACTION>
            <CONTENTID>23</CONTENTID>
            <DOCUMENTID>21</DOCUMENTID>
            <EVENTHANDLER>on_submit_page</EVENTHANDLER>
        </EVENT>
    </EVENTSTREAM>
</SRM:STATE>
```

SRM:

<SRM:RESP status="ok"></SRM:RESP>

If the SRM informs the IDT that the state already exists, the IDT may ask some document description details from the user (for example, the user may specify that this document should be identified by a certain text which is not present in the documents in the other state which is similar to this one). The SRM will try to reanalyze the state output given the additional user input and if the additional information helps to differentiate the states, the state will be added as a new state.

XML Applications

Most common XML applications are HTML web-based applications and this connector supports these applications. There are two distinct issues that the connector has to deal with in supporting XML applications. These are data representation (state recognition and content retrieval) and transition actions. State recognition and content retrieval are supported on any XML document or set of documents (multiple documents are possible in one state only through the use of HTML windows and frames). The transition actions supported are an arbitrary user event (as represented by the event object) and GET and POST requests to an arbitrary URL.

The XML Connector interoperates between the Pattern Replay Engine, the User Agent and the State Recognition Module.

Figure 28:
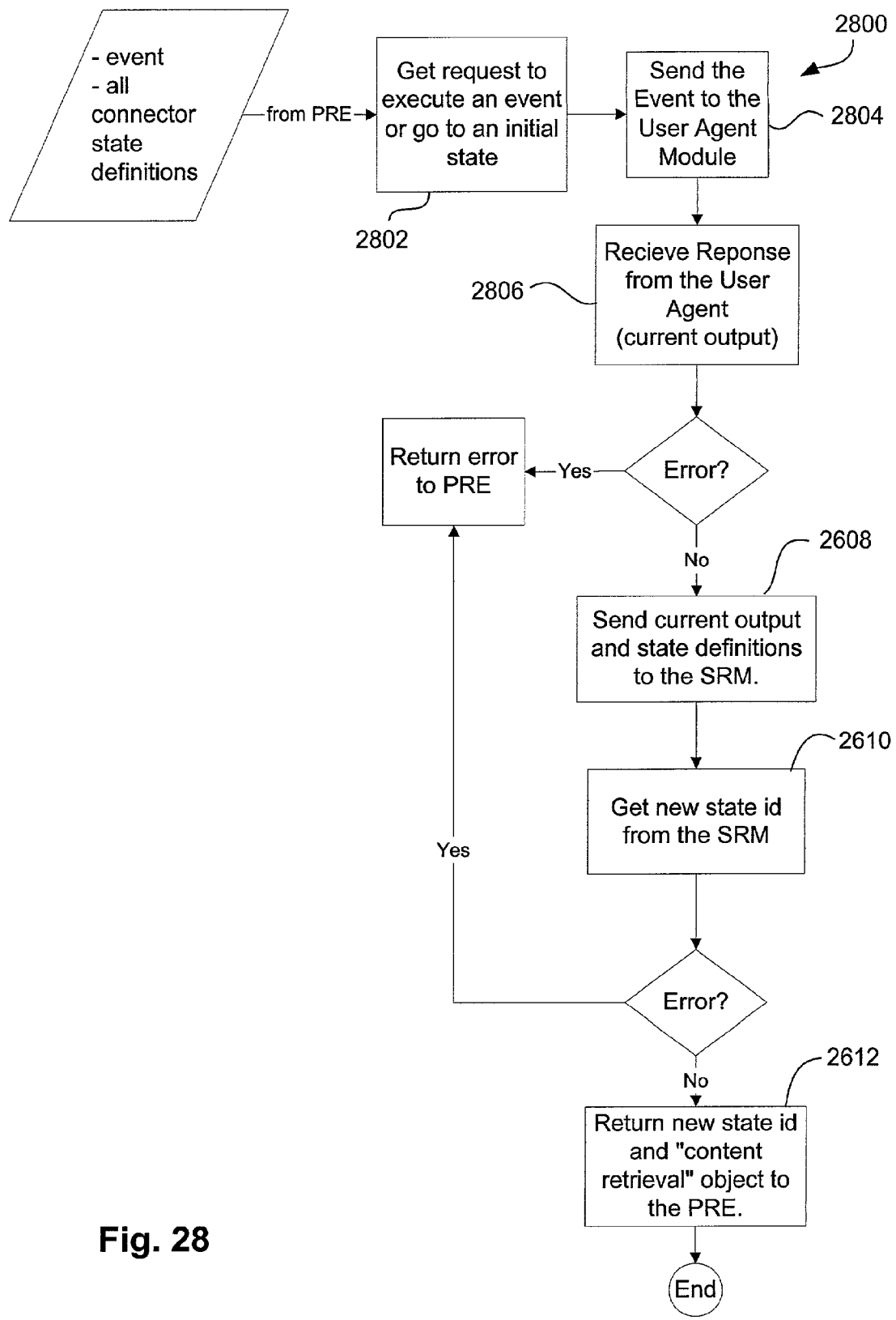
FIG. 28 depicts a program flow of the Connector.

FIG. 28 depicts a program flow 2800 of the Connector. As shown, a request to execute an event or go to an initial state is received from the PRE in operation 2802. In operation 2804, the event is sent to the User Agent. A response is received from the User Agent in operation 2806. If an error is found, the error is returned to the PRE. If no error is found, the current output and state definitions are sent to the SRM in operation 2808. In operation 2810, a new state id is received from the SRM. If an error is found in the state id, it is send to the PRE. If no error is found, the new state id and content retrieval object are sent to the PRE in operation 2812.

Additional Embodiment of the SRM

While sophisticated techniques can be used to recognize a remote state by its output structure, an embodiment of the present invention identifies a state by the content of its documents rather than by the layout structure of these documents. So if on day a site navigation menu is in the left frame and the contents of the site is in the right frame and the next day it is the opposite, that does not have any impact on the functionality of the site at that state. In light of the above, while the SRM has the information about the exact structure of the state's output, state recognition occurs based only upon whether the required documents are present in the unordered list of the documents output at the current state. So, state recognition most heavily relies upon individual document recognition (performed by the CRM).

The SRM works according to this algorithm:
  Send all documents from the current output to the CRM for document recognition
  Compare the list of document ids in the definition of each state in the pattern (of the proper type) with the list of document ids in the current output.
  If a match is found, state is identified. (See below on how matching is done.)
  If more then one match is found, then output structures are compared for the matched states.

There are two additional features in the SRM, which provide some more intelligence for state recognition. One is the Transition Probability List (TPL). This list provides an ordered array of state ids (which have higher probability than others to match the current output) where the first state id corresponds to the state that will be the most probable to match the current output, the second state id corresponds to state which is the second most probable state to match the current output and so on. The Pattern Replay Engine can create this vector by keeping a history of which states resulted from a certain action being executed in a certain state. So if during last replay (or record) action x executed in state A resulted in state B, then during current replay when x is executed in A, B will be the most probable resulting state, more so than any other state in the pattern. During each replay the resulting state id can be saved for any state-action combination and that information can be used later to create the transition probability list.

The transition probability list is used by the SRM to generate hints for document recognition, which are sent to the CRM. The hints are provided in an ordered list of document ids where the position of document ids implies their probability. Thus, the first document id is the most probable to match the current document, the next one has second highest probability and so on (similar to the transition probability list). The output structure is used to generate hints. Each state id in the transition probability list points to state properties. The structure of the each state's output, as given by the properties, is compared with the current output structure being analyzed, and if a document's tree position matches the position of a document element in state properties, the id of that document element is sent as the most probable to match that document. The next most probable ids are the ids of documents on the same level of the tree and the next are all document ids given by the state property. If tree positions do not match, then the list of all document ids in the more probable states will be sent as more probable to match each document in the current output.

Example

If pattern contains two state properties as follows:

```
<SRM:STATE id="1">
    <SRM:DOC id="11" type="window" rank="necessary">
        <SRM:DOC id="111" type="frame" rank="necessary">
            <SRM:DOC id="1111" type="frame"
```

-continued

```
            rank="necessary">
            </SRM:DOC>
            <SRM:DOC id="1112" type="frame"
            rank="necessary">
            </SRM:DOC>
            <SRM:DOC id="1113" type="frame"
            rank="ignore">
            </SRM:DOC>
        </SRM:DOC>
    </SRM:DOC>
</SRM: STATE>
<SRM:STATE id="2">
    <SRM:DOC id="21" type="window" rank="necessary">
        <SRM:DOC id="211" type="frame" rank="necessary">
            <SRM:DOC id="2111" type="frame" rank="necessary">
            </SRM:DOC>
            <SRM:DOC id="2112" type="frame" rank="necessary">
                <SRM:DOC id="21121" type="iframe"
            rank="ignore">
                </SRM:DOC>
            </SRM:DOC>
        </SRM:DOC>
    </SRM:DOC>
</SRM:STATE>
```

The transition probability list is: TPL="2,1".

If current step output received has a window with two frames inside, the hints list for the first frame will be an ordered list "2111, 2112, 211, 21, 21121, 1111, 1112, 1113, 111, 11".

Another feature is the document importance ranking. This enables the designer to provide a rank to each document signifying how important its presence is to identifying the state. The ranking is specified on the scale from 1 through 5, where 1 means that the document must be present for the state to be recognized and 5 means that the presence of the document has no bearing on state recognition (2, 3 and 4 are for additional flexibility and can be used for more sophisticated state recognition). The IDT provides the designer an ability to provide importance ranking for each document in a state as part of document description. If such ranking is not provided, all documents with any identified content elements are given a ranking of 1, otherwise a document is ranked with a 5.

Interaction with Java Applets

Java and JavaScript

Java is a programming language introduced by Sun Microsystems in 1995 and expressly designed for use in the distributed environment of the Internet. It was designed to have the "look and feel" of the C++ language, but it is simpler to use than C++ and enforces an object-oriented programming model. Java can be used to create complete applications that may run on a single computer or be distributed among servers and clients in a network. It can also be used to build a small application module or applet for use as part of a Web page.

An applet is a program that can be sent along with a Web page to a user. Java applets can perform interactive animations, immediate calculations, or other tasks without having to send a user request back to the server.

JavaScript should not be confused with Java. JavaScript, which originated at Netscape, is interpreted at a higher level, but lacks some of the portability of Java and the speed of a byte coded language. Because Java applets will run on almost any operating system without requiring recompilation and because Java has no operating system-unique extensions or variations, Java is generally regarded as the most strategic language in which to develop applications for the Web. However, JavaScript can be useful for very small applications that run on the Web client or server.

User Agent

As mentioned above, one function of the User Agent is to interact with and retrieve various types of content from a data source, website, etc. The User Agent is also able to retrieve HTML or XHTML rendered by various types of active content and scripting such as JavaScript, etc. The User Agent is also able to perform scripting events. An interface allows a user, computer program, etc. to remotely query the User Agent and get the content from the User Agent, thus accurately capturing the content on the website.

In addition to the security restrictions, a major difficulty in generically allowing Java applets to be integrated is how to represent the contents of the applet in a manner useful to the application. The present invention addresses this problem by representing the applet's contents as XHTML, and then providing a system for recording and replaying events against XHTML documents. Thus, using embodiments of the present invention, a developer can aggregate content from a web-page, including content inside a Java applet, using a single easy to use mechanism. This mechanism allows the developer to identify which elements of the user interface presented by the applet are of interest in the application, and to record events against those elements such as pressing a button, or entering data into an entry field. When the application is running, these events can be played back to the applet. One potential application of this invention therefore is the ability to mobilize an existing Java applet without requiring the mobile device to include a Java interpreter (Virtual Machine).

Further, embodiments of the present invention make it possible to integrate Java applets with background functionalities to automatically take data out of the applet in order to apply functionality to the data, thus enabling a plethora of possibilities, including output on wireless devices, placing alerts on the data, voice-enabling the data, etc.

The following description shows how the various embodiments enable the User Agent to interact with Java applets and extract data from them. By enabling the User Agent to interact with such applets, the range of content available to the User Agent, and ultimately the user, is greatly expanded.

Figure 29:
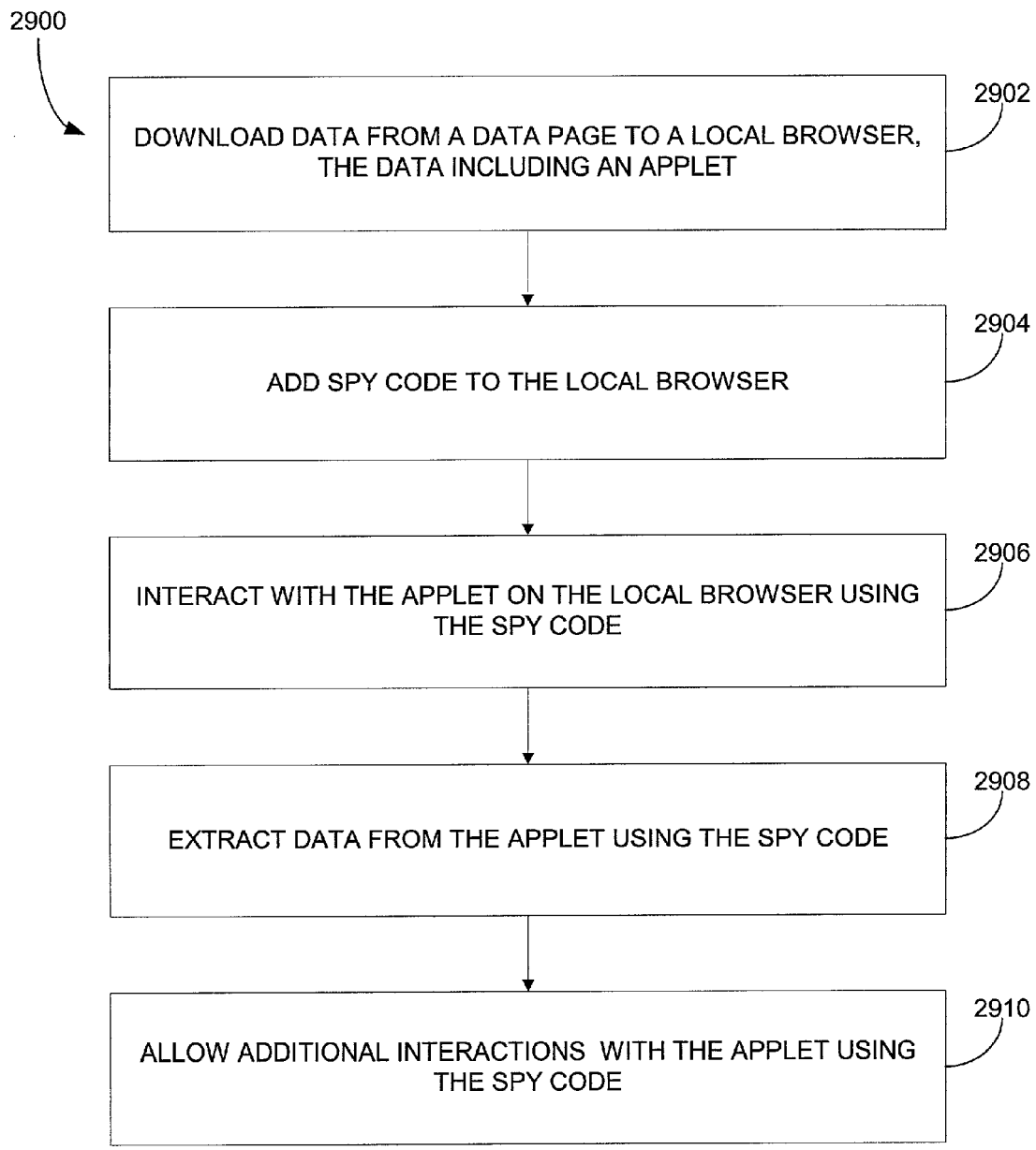
FIG. 29 is a flow diagram of a process for interacting with a Java applet according to an embodiment.

FIG. 29 is a flow diagram of a process 2900 for interacting with a Java applet. In operation 2902, data from a data page is downloaded to a browser. The data includes an applet written in Java. Spy code is added in operation 2904. The spy code is used for interacting with the applet in a browser in operation 2906. In operation 2908, data is extracted from the applet using the spy code. Also, additional interactions with the applet on the browser can be allowed using the spy code. Note operation 2910.

Figure 30:
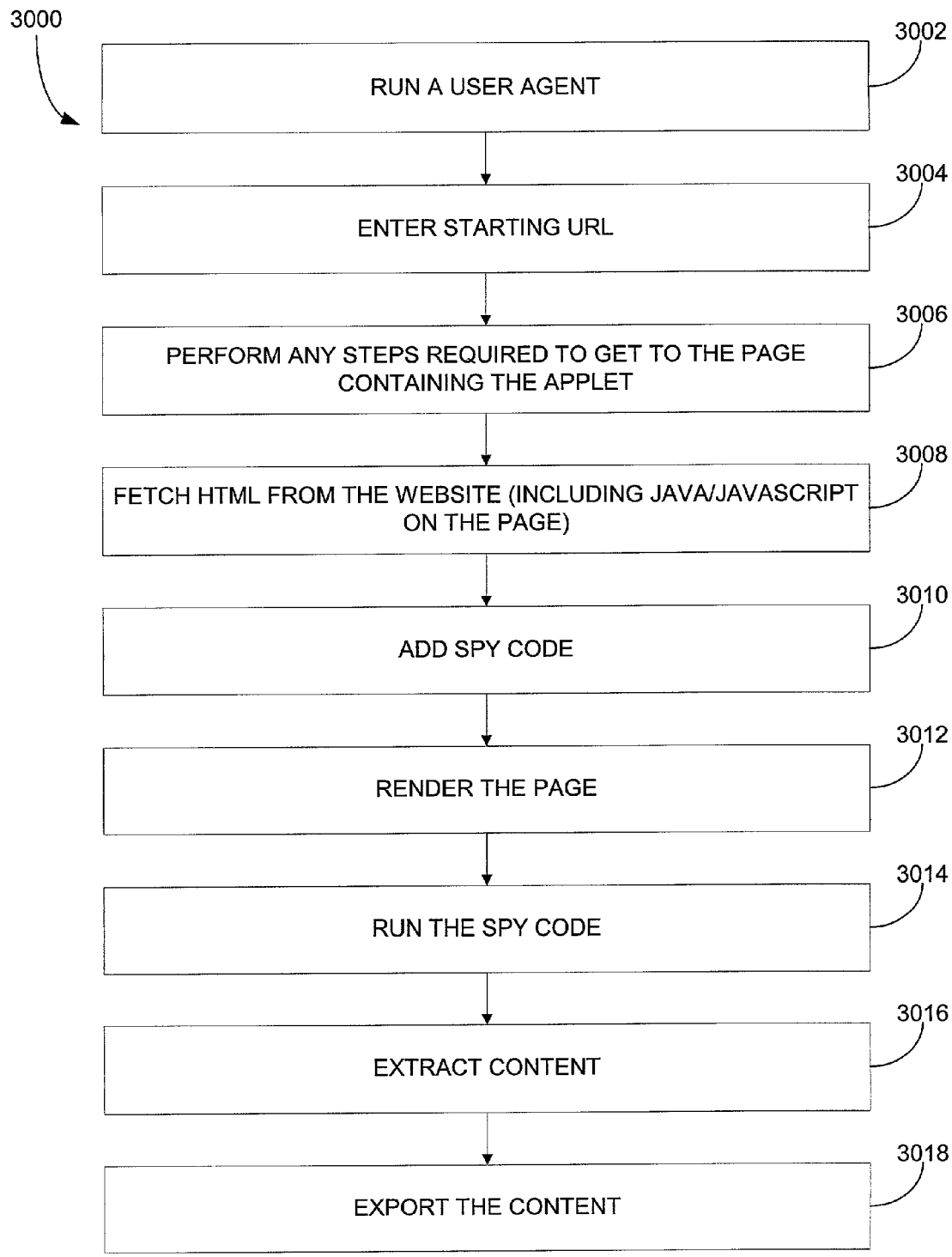
FIG. 30 is a flow diagram of a process for interacting with a Java applet in accordance with another embodiment.

FIG. 30 is a flow diagram of a process 3000 for interacting with a Java applet. As shown, a modified User Agent application is run in operation 3002. As discussed above, the User Agent retrieves output from a remote application and executes user actions on that output. Further, the User Agent can act at the direction of a user and/or software. The User Agent preferably acts as the host for the Java applet.

In operation 3004, the starting URL is entered. This URL is to the initial page which a user could navigate to in order to eventually reach the page with the applet. Such a page can be a login page, a home page, etc. Note that the page could also be the actual page where applet is. The URL entered may depend on the applet.

In operation 3006, any steps required to get to the page containing the Java applet are performed. This can include navigating through various pages, and can be performed automatically by following a pattern, as described above. For example, the starting URL may be CNN.com. The user agent would navigate to CNN.com and select the weather link, which points to a weather page with a Java applet on it. As another example, a login script can be executed. At this point, the page with the applet is accessible.

In operation 3008, the HTML/XML is retrieved from the website to a browser. The Java applet(s) on the page are also fetched and loaded.

Operations 3010-3014 concern how modified User Agent functionality is launched to capture the data from the applet.

In operation 3010, code that can communicate with the applet is added by the browser. Note that a User Agent can act as the browser and host the applet. This code preferably is always the same, regardless of the Applet(s) being aggregated. In one embodiment, this code is implemented using the JavaScript programming language. This code will be referred to henceforth as "the spy" or "spy code." The User Agent inserts the spy into the page in such a way that it runs in the same security context as the original applet. This allows the spy code to freely access the applet's data, and also to send events to the data. Because the spy code is under the control of the User Agent, it enables the User Agent to direct the spy to access specific areas of the applet, as required by the application.

The spy code is generic and can interact with any applet on any website. Such code may be Java, JavaScript code, etc. The User Agent preferably adds the code, which can be retrieved from storage on a local device such as the hard drive of the machine on which the User Agent is installed.

In operation 3012, the page is rendered. Again, because the User Agent can act as a type of browser, the page can be rendered on the User Agent. At this point, the page with the applet can be made visible, and the user can be allowed to see the applet and/or interact with the applet in a normal way.

In operation 3014, the code is run on the page (with or without the user knowing it is running). The code preferably allows the User Agent to query information from the applet to extract the data out of the applet. See operation 3016.

According to one embodiment, during the application design phase, when the user is recording the interactions with the web site that can be replayed later, the spy code is used to render the applet's contents as XHTML. This allows the platform to record user interactions with the applet using the same mechanism described above in the sections preceding discussion of the embodiments for interacting with Java applets, as well as in the U.S. patent application entitled SYSTEM, METHOD AND COMPUTER PROGRAM PRODUCT FOR PATTERN REPLAY USING STATE RECOGNITION, filed non-provisionally Aug. 28, 2001 under Ser. No. 09/942,080; U.S. patent application entitled SYSTEM, METHOD AND COMPUTER PROGRAM PRODUCT FOR RETRIEVING ARBITRARY CONTENT FROM A REMOTE DATA SITE FOR OUTPUT TO A DEVICE IN A FORMAT SUITABLE FOR THAT DEVICE, filed non-provisionally Aug. 28, 2001 under Ser. No. 09/942,262; U.S. patent application entitled SYSTEM, METHOD AND COMPUTER PROGRAM PRODUCT FOR RECOGNIZING A STATE OF A REMOTE APPLICATION, filed non-provisionally Aug. 28, 2001 under Ser. No. 09/942,263; SYSTEM, METHOD AND COMPUTER PROGRAM PRODUCT FOR A USER AGENT FOR PATTERN REPLAY, filed non-provisionally Aug. 28, 2001 under Ser.

No. 09/942,081; and U.S. patent application entitled INTERFACE FOR MOBILIZING CONTENT AND TRANSACTIONS ON MULTIPLE CLASSES OF DEVICES, filed non-provisionally Sep. 14, 2001 under Ser. No. 09/953,372, each of which is assigned to common assignee, Clickmarks, Inc., and which are all herein incorporated by reference for all purposes. All user actions are recorded, including clicking on buttons, filling in entry fields, etc. Also, the user can identify specific elements, represented as HTML tables, as being "of interest" to the application. The system computes an address for these elements, in order to recognize those elements again at runtime.

During application runtime (pattern replay) the recorded events are replayed against the page, including any relevant applets on the page. Events which were recorded at design time are re-played to the applet using the spy. Similarly, data entered by the user into specific input elements are sent to the corresponding input UI controls of the applet. Thus the applet can be made to produce the same outputs as were recorded during the design process (pattern record).

A note about security: The spy code is used to record specific user actions, and to replay those actions at the user's request. There is therefore no breach of security, as the system can only carry out actions against the applet that were previously recorded, and for which the user must have proper authorization. Nonetheless, it is up to the administrator of the system to ensure that the spy code is not used in an unauthorized manner.

In use, routines may be used to analyze the structure of the Java applet to identify extractable data. Preferably, the routines drill down through the hierarchical structure of the applet, including windows in windows, where lower windows may have text fields, input windows, etc. to create a tree-type structure of the data.

The User Agent is then able to review the entire content of the applet, or the representative data tree, and extract data therefrom. Preferably, the User Agent uses handlers for each data type. For instance, a text handler can be used to extract bare textual data from the Applet's UI controls. Using handlers, any type of text, tables, etc. that are viewable in the applet can be captured. For example, if the applet is on a financial website, data that may be extracted can include deposits, withdrawals, check numbers, dates, etc.

In operation 3018, the data extracted from the applet is exported to memory, to another program, to an output device, etc. Because the data can be exported as XHTML, the full power of the rest of the system to manipulate XHTML can be brought to bear. The extracted data can be used for any purpose, such as applying functionality to it. Such functionality can include mobilizing the data (formatting and outputting it on a wireless and/or mobile device), put it in habitat, put an alert on it, transform it, etc.

The data can be sent to a Transcoder (see FIG. 2 and the related discussion) for ultimate output on a client device. In particular, the data can be transcoded for display on a wide variety of mobile devices, as described in the U.S. patent application entitled SYSTEM, METHOD AND COMPUTER PROGRAM PRODUCT FOR PAGE RENDERING UTILIZING TRANSCODING, Aug. 28, 2001 under Ser. No. 09/942,051 and assigned to common assignee, Clickmarks, Inc., and which is herein incorporated by reference for all purposes.

The data can also be used to receive, and apply user input back to the applet, to allow full interaction with the applet from devices or programs not normally capable of hosting or interacting with Java applets.

The data can be output in a structured format. Further, the data can be output to the user in a report-like format, which is particularly useful when output to a wireless/mobile device unable to run the applet by itself.

Additional Embodiment

The mechanism described above can be used to spy on and interact with any other browser object, including but not limited to, an ActiveX control.

An ActiveX control is a component program object that can be re-used by many application programs within a computer or among computers in a network. The technology for creating ActiveX controls is part of Microsoft's overall ActiveX set of technologies, chief of which is the Component Object Model (COM). ActiveX controls can be downloaded as small programs or animations for Web pages, but they can also be used for any commonly-needed task by an application program in the latest Windows and Macintosh environments. In general, ActiveX controls replace the earlier OCX (Object Linking and Embedding custom controls). An ActiveX control is roughly equivalent in concept and implementation to the Java applet.

An ActiveX control can be created in any programming language that recognizes Microsoft's Component Object Model. The distributed support for COM is called the Distributed Component Object Model (DCOM). In implementation, an ActiveX control is a dynamic link library (DLL) module. An ActiveX control runs in what is known as a container, an application program that uses the Component Object Model program interfaces. This reuseable component approach to application development reduces development time and improves program capability and quality. Windows application development programs such as PowerBuilder and Microsoft Access take advantage of ActiveX controls.

Visual Basic and C++ are commonly used to write ActiveX controls.

Figure 31:
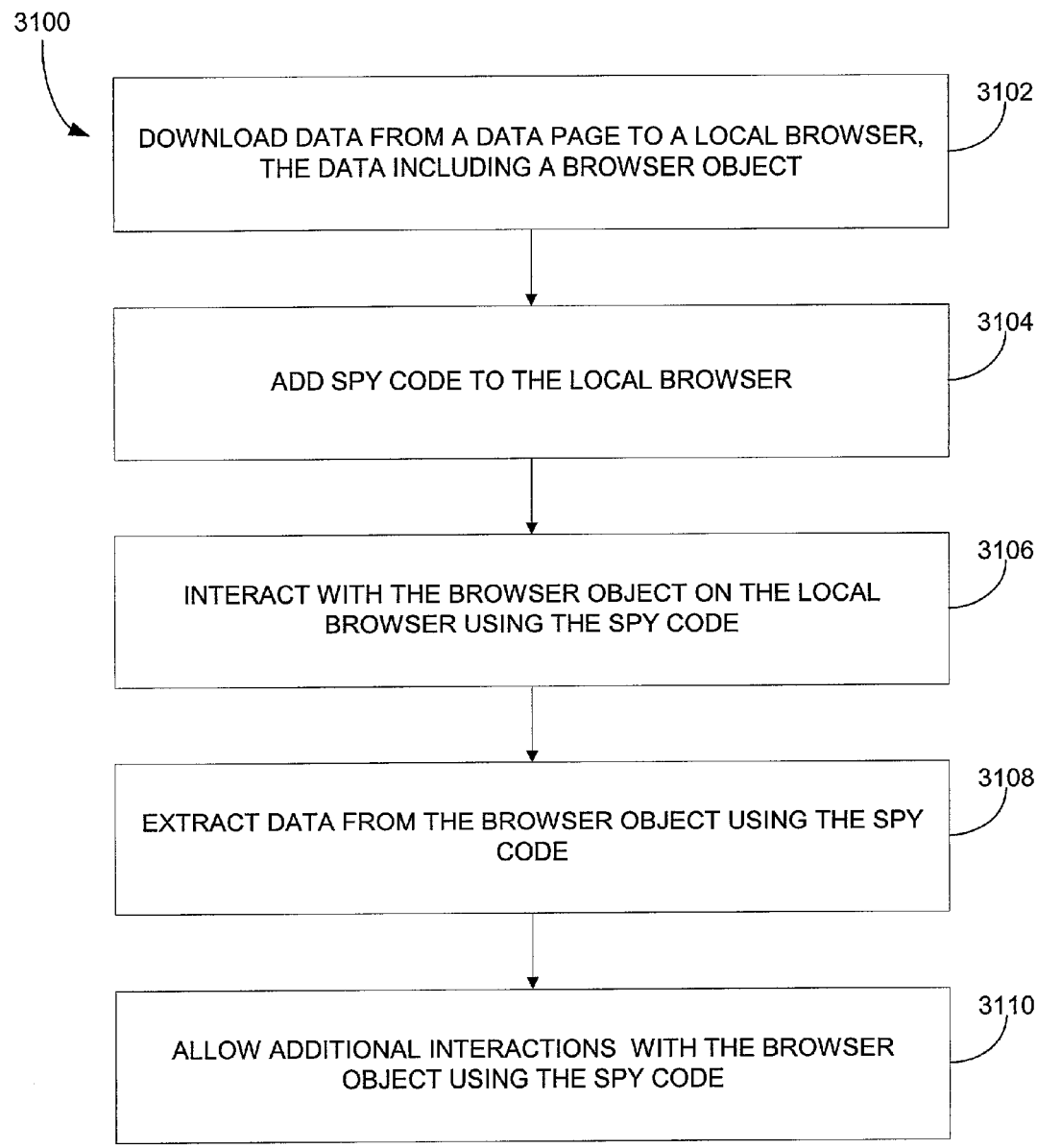
FIG. 31 is a flow diagram of a process for interacting with a browser object, such as an activeX control in MICROSOFT® Internet Explorer.

FIG. 31 is a flow diagram of a process 3100 for interacting with a browser object, such as an ActiveX control in MICROSOFT® Internet Explorer. In operation 3102, data from a data page is downloaded to a browser. The data includes a browser object. Spy code is added to the browser (or other program running the browser object) in operation 3104. The spy code is used for interacting with the browser object in a browser in operation 3106. Note that this can include interactions performed by the spy code itself. In operation 3108, data is extracted from the browser object using the spy code. Also, additional interactions with the browser object on the browser can be allowed using the spy code. Note operation 3110.

In one embodiment, a user agent is initiated and used to navigate to the data page having the browser object. The spy code can be stored on a local device, including the device hosting the browser. In a further embodiment, the data page is rendered as XHTML or some other suitable format. As an option, the data extracted from the browser object can be displayed to a user. Preferably, the user is allowed to record user interactions with the browser object.

In an embodiment, a structural analysis of the browser object is performed for identifying data for extraction. Note that the structural analysis can be performed during replay of the recorded user interactions, with the data being identified per the user's specifications. The extracted data can be formatted into a structured format. Functionality can be applied to at least a portion of the extracted data. Such functionality can include mobilizing at least a portion of the extracted data, placing the extracted data in a habitat, setting an alert on at least a portion of the extracted data, applying user input to the browser object using the spy code, etc.

While various embodiments have been described above, it should be understood that they have been presented by way of example only, and not limitation. Therefore, the breadth and scope of a preferred embodiment should not be limited by any of the above-described exemplary embodiments, but should be defined only in accordance with the following claims and their equivalents.

What is claimed is:

1. A method for extracting dam from an applet, comprising:
   (a) downloading data from a data page to a browser, wherein the data includes an applet written in Java;
   (b) adding spy code;
   (c) interacting with the applet on the browser using the spy code;
   (d) performing a structural analysis of the applet for identifying data for extraction;
   (e) extracting data from the applet on the browser using the spy code; and
   (f) applying functionality to at least a portion of the extracted data;
   wherein a user interaction is simulated for navigating a network site based on client specifications.

2. The method as recited in claim 1, further comprising initiating a user agent for navigating to the data page having the applet.

3. The method as recited in claim 1, further comprising rendering the extracted data.

4. The method as recited in claim 3, further comprising displaying the data extracted from the applet.

5. The method as recited in claim 1, further comprising allowing the user to record user interactions with the applet.

6. The method as recited in claim 1, further comprising formatting the extracted data into a structured format.

7. The method as recited in claim 1, wherein the application of functionality includes mobilizing at least a portion of the extracted data.

8. The method as recited in claim 1, wherein the application of functionality includes placing the extracted data in a habitat.

9. The method as recited in claim 1, wherein the application of functionality includes setting an alert on at least a portion of the extracted data.

10. The method as recited in claim 1, wherein the application of functionality includes applying user input to the applet using the spy code.

11. A computer program product embodied on a tangible computer readable storage medium for extracting data from an applet, comprising:
   (a) code for downloading dam from a data page to a browser, wherein the data includes an applet written in Java;
   (b) code for adding spy code;
   (c) code for interacting with the applet on the browser using the spy code;
   (d) code for performing a structural analysis of the applet for identifying data for extraction;
   (e) code for extracting data from the applet on the browser using the spy code; and
   (f) code for applying functionality to at least a portion of the extracted data;
   wherein a user interaction is simulated for navigating a network site based on client specifications.

12. A system for extracting data from an applet, comprising:
   (a) logic for downloading dam from a data page to a browser, wherein the data includes an applet written in Java;
   (b) logic for adding spy code;
   (c) logic for interacting with the applet on the browser using the spy code;
   (d) logic for performing a structural analysis of the applet for identifying data for extraction;
   (e) logic for extracting data from the applet on the browser using the spy code; and
   (f) logic for applying functionality to at least a portion of the extracted data;
   wherein a user interaction is simulated for navigating a network site based on client specifications.

13. A method for interacting with an applet, comprising:
   (a) downloading data from a data page to a browser, wherein the data includes an applet written in Java;
   (b) retrieving spy code;
   (c) adding the spy code;
   (d) running the spy code on the browser;
   (e) interacting with the applet using the spy code;
   (f) performing a structural analysis of the applet for identifying data for extraction;
   (g) extracting at least a portion of the identified data from the applet on the browser; and
   (h) applying functionality to at least a portion of the extracted data;
   wherein a user interaction is simulated for navigating a network site based, on client specifications.

14. The method as recited in claim 13, further comprising initiating a user agent for navigating to the data page having the applet.

15. The method as recited in claim 13, further comprising rendering the data page.

16. The method as recited in claim 15, further comprising displaying the data page to a user.

17. The method as recited in claim 13, further comprising formatting the extracted data into a structured format.

18. The method as recited in claim 13, wherein the application of functionality includes mobilizing at least a portion of the extracted data.

19. The method as recited in claim 13, wherein the application of functionality includes placing the extracted data in a habitat.

20. The method as recited in claim 13, wherein the application of functionality includes setting an alert on at least a portion of the extracted data.

21. A method for interacting with an applet, comprising:
   (a) entering address information for accessing a web page having an applet written in Java;
   (b) downloading the web page from a network site to a browser;
   (c) rendering the web page for further processing;
   (d) retrieving spy code;
   (e) running the spy code on the browser in a same security context as the applet;
   (f) interacting with the applet on the browses using the spy code;
   (g) performing a structural analysis of the applet for identifying data for extraction from the applet;
   (h) extracting data from the applet using a user agent;
   (i) exporting the extracted data; and
   (j) applying functionality to at least a portion of the extracted data;

wherein a user interaction is simulated for navigating the network site based on client specifications.

22. A method for extracting data from a browser object, comprising:
(a) downloading data from a data page to a browser, wherein the data includes a browser object;
(b) adding spy code;
(c) interacting with the browser object on the browser using the spy code;
(d) performing a structural analysis of the browser object for identifying data for extraction;
(e) extracting data from the browser object on the browser using the spy code; and
(f) applying functionality to at least a portion of the extracted data;
wherein a user interaction, is simulated for navigating a network site based on client specifications.

23. The method as recited in claim 22, wherein the browser object is an ActiveX control.

24. The method as recited in claim 22, further comprising initiating a user agent for navigating to the data page having the browser object.

25. The method as recited in claim 22, further comprising rendering the extracted data.

26. The method as recited in claim 22, further comprising allowing the user to record user interactions with the browser object.

27. The method as recited in claim 22, wherein the application of functionality includes mobilizing at least a portion of the extracted data.

28. The method as recited in claim 22, wherein the application of functionality includes placing the extracted data in a habitat.

29. The method as recited in claim 22, wherein the application of functionality includes setting an alert on at least a portion of the extracted data.

30. The method as recited in claim 22, wherein the application of functionality includes applying user input to the browser object using the spy code.

31. A method for interacting with a browser object, comprising:
(a) downloading data from a data page to a browser, wherein the data includes a browser object;
(b) retrieving spy code;
(c) adding the spy code;
(d) running the spy code on the browser;
(e) interacting with the browser object using the spy code;
(f) performing a structural analysis of the browser object for identifying data for extraction;
(g) extracting at least a portion of the identified data from the browser object on the browser;
(f) applying functionality to at least a portion of the extracted data;
wherein a user-interaction is simulated for navigating a network site based on client specifications.

32. The method as recited in claim 31, wherein the browser object is an ActiveX control.

33. A method for interacting with an applet, comprising:
(a) accessing a network site utilizing a network;
(b) simulating user interaction for navigating the network site based on client specifications;
(c) downloading a web page from the network site to a browser the web page having an applet written in Java;
(d) assigning identifiers to elements of the web page;
(e) rendering the web page on the browser for further processing;
(f) rendering dynamic content of the web page;
(g) retrieving spy code;
(h) adding the spy code to the browser, the spy code being for interacting with the applet on the browser;
(i) displaying the rendered web page, wherein the user can interact with the applet;
(j) running the spy code on the browser in a same security context as the applet;
(k) performing a structural analysis of the applet for identifying data for extraction;
(l) extracting data from the applet using a user agent;
(m) formatting the extracted data into a structured format; and
(n) exporting the extracted data;
(o) applying functionality to at least a portion of the extracted data;
wherein a user interaction is simulated for navigating a network site based on client specifications.

34. The method as recited in claim 1, wherein the navigating includes logging in to a web site.

35. The method as recited in claim 1, wherein a client associated with the client specifications includes a process for making a network request and receiving a response.

* * * * *